US012625225B2

(12) United States Patent (10) Patent No.: US 12,625,225 B2
Nam et al. (45) Date of Patent: May 12, 2026

(54) MEASUREMENT AND REPORTING FOR NEW RADIO WIRELESS SENSING

(71) Applicant: QUALCOMM Incorporated, San Diego, CA (US)

(72) Inventors: Wooseok Nam, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 298 days.

(21) Appl. No.: 18/361,247

(22) Filed: Jul. 28, 2023

(65) Prior Publication Data

US 2025/0035735 A1 Jan. 30, 2025

(51) Int. Cl.
G01S 7/00 (2006.01)
G01S 13/00 (2006.01)
(52) U.S. Cl.
CPC ............ G01S 7/006 (2013.01); G01S 13/003 (2013.01)
(58) Field of Classification Search
CPC ............................... G01S 7/006; G01S 13/003
See application file for complete search history.

(56) References Cited

U.S. PATENT DOCUMENTS

2018/0192384 A1* 7/2018 Chou .................... H04W 24/10
2021/0389407 A1 12/2021 Park et al.

2022/0159415 A1* 5/2022 Khoryaev ............. H04W 64/00
2022/0229143 A1* 7/2022 Dwivedi ............... G01S 5/0273
2022/0231805 A1 7/2022 Bao et al.
2023/0284122 A1* 9/2023 Khosravirad ........... G01S 7/006
370/252
2023/0328680 A1* 10/2023 Cha ........................ H04W 24/10
2024/0080074 A1* 3/2024 Lee .......................... G01S 7/006
2024/0337723 A1* 10/2024 Li ........................... G01S 7/006
2024/0421889 A1* 12/2024 Rahman ............. H04B 7/06968

FOREIGN PATENT DOCUMENTS

WO 2022192887 A2 9/2022

OTHER PUBLICATIONS

International Search Report and Written Opinion—PCT/US2024/031484—ISA/EPO—Oct. 9, 2024.

* cited by examiner

*Primary Examiner* — William Kelleher
*Assistant Examiner* — Hailey R Le
(74) *Attorney, Agent, or Firm* — Thien T. Nguyen

(57) ABSTRACT

Disclosed are techniques for wireless communication. In some aspects, a network entity receives a positioning report from a user equipment (UE). The network entity transmits, to the UE, an indication of a reference transmission-reception point (TRP) for sensing operations based at least on the positioning report. In some aspects, a UE receives from a network entity, an indication of a reference TRP to use in a cooperative sensing scheme. The UE transmits a sensing measurement report including one or more measurements associated with time of arrivals (TOAs) of arrival paths of the reference TRP and one or more neighboring TRPs with respect to a reference time.

26 Claims, 17 Drawing Sheets

200

500

530

600

602

606

Target

608

618

602

602-a 608-a

UE    UE    • • •    UE 604-a    604-b    604

700

706
Target

710   $R_{1-T}$                    $R_{2-T}$ 702-a           710
              $R_{T-U}$ $R_{1-U}$              UE              $R_{2-U}$       702-b 708           704                    $R_{3-T}$ $R_{3-U}$ 702-c

NLOS
LOS

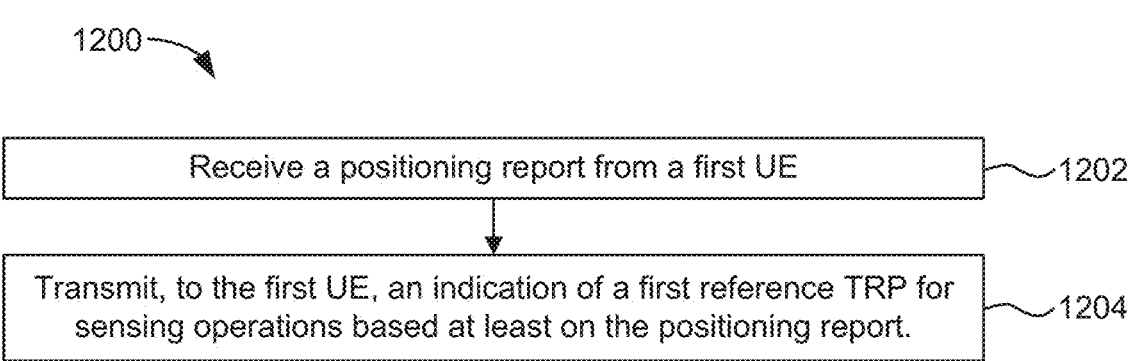

| Receive a positioning report from a first UE | ⟍1202 |

| Transmit, to the first UE, an indication of a first reference TRP for sensing operations based at least on the positioning report. | ⟍1204 |

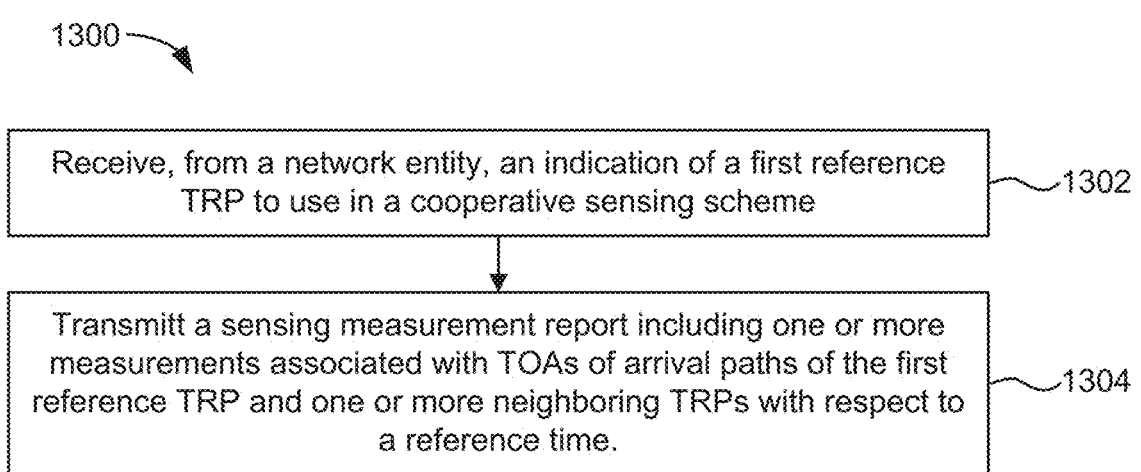

| Receive, from a network entity, an indication of a first reference TRP to use in a cooperative sensing scheme | ⟍1302 |

| Transmitt a sensing measurement report including one or more measurements associated with TOAs of arrival paths of the first reference TRP and one or more neighboring TRPs with respect to a reference time. | ⟍1304 |

*FIG. 13*

MEASUREMENT AND REPORTING FOR NEW RADIO WIRELESS SENSING

BACKGROUND OF THE DISCLOSURE

1. Field of the Disclosure

Aspects of the disclosure relate generally to wireless technologies.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a network entity includes receiving a positioning report from a first user equipment (UE); and transmitting, to the first UE, an indication of a first reference transmission-reception point (TRP) for sensing operations based at least on the positioning report.

In some aspects, the method includes determining one or more line of sight (LOS) transmission-reception points (TRPs) and one or more non-line of sight (NLOS) TRPs based at least on the positioning report; and selecting the first reference TRP from the one or more LOS TRPs.

In some aspects, the method includes applying a filtering scheme to determine the one or more LOS TRPs and the one or more NLOS TRPs.

In some aspects, the method includes determining the one or more LOS TRPs based at least in part on a strength of a LOS path from each LOS TRP of the one or more LOS TRPs to the first UE.

In some aspects, selecting the first reference TRP from the one or more LOS TRPs comprises selecting the first reference TRP based at least in part on a number of user equipments (UEs) in a set of UEs including the first UE that have a LOS path with the first reference TRP.

In some aspects, the first reference TRP has a first LOS path; and a second TRP of the one or more LOS TRPs has a second LOS path that is stronger than the first LOS path.

In some aspects, the method includes determining a set of delay measurements, the set of delay measurements comprising a delay measurement from each LOS TRP of the one or more LOS TRPs to each UE of a plurality of UEs including the first UE; and selecting the first reference TRP from the one or more LOS TRPs based at least in part on the set of delay measurements.

In some aspects, the method includes selecting a second LOS TRP to be in a first subset of the one or more LOS TRPs and the one or more NLOS TRPs with the first reference TRP based at least in part on the set of delay measurements; and transmitting an indication to the first UE that first reference signals corresponding to the first reference TRP are common with second reference signals corresponding to the second LOS TRP.

In some aspects, the first subset including the first reference TRP comprises a cooperative sensing scheme.

In some aspects, the method includes transmitting an indication of a first timing offset to the first UE, and wherein the first timing offset corresponds to a time delay associated with signal transmission from the first reference TRP and the first timing offset is determined based at least in part on the positioning report.

In some aspects, the method includes transmitting an indication of a first timing reference to the first UE, and wherein the first timing reference corresponds to a global navigation satellite system (GNSS) associated with signal transmission from the first reference TRP.

In some aspects, the method includes determining a second reference TRP for sensing operations based at least on a cooperative sensing scheme for a plurality of UEs including the first UE and a second UE; and transmitting, to the second UE, an indication of the second reference TRP for sensing operations.

In some aspects, the first reference TRP and the second reference TRP correspond to a same target object in the cooperative sensing scheme.

In an aspect, a method of wireless communication performed by a UE includes receiving, from a network entity, an indication of a first reference TRP to use in a cooperative sensing scheme; and transmitting a sensing measurement report including one or more measurements associated with time of arrivals (TOAs) of arrival paths of the first reference TRP and one or more neighboring TRPs with respect to a reference time.

In some aspects, the reference time is determined based at least in part on a transmission time associated with the first reference TRP.

In some aspects, the method includes receiving, from the network entity, an indication of a timing offset to use in the cooperative sensing scheme.

In some aspects, the reference time is determined based at least in part on the timing offset.

In some aspects, the method includes determining a relative time difference value associated with a time of arrival (TOA) of an arrival path from a second TRP of the one or more neighboring TRPs from the timing offset, a TOA for a first arrival path (FAP) of the first reference TRP, and the TOA of the arrival path from the second TRP; and including the relative time difference value in the sensing measurement report.

In some aspects, at least one arrival path of the arrival paths of the first reference TRP and the one or more neighboring TRPs is estimated to be a NLOS path.

In some aspects, the method includes receiving an indication that the UE is to refrain from including a TOA associated with a FAP of a second TRP of the one or more neighboring TRPs in the sensing measurement report and to include a TOA associated with a FAP of a third TRP of the one or more neighboring TRPs in the sensing measurement report.

In an aspect, a network entity includes one or more memories; one or more transceivers; and one or more processors communicatively coupled to the one or more memories and the one or more transceivers, the one or more processors, either alone or in combination, configured to: receive, via the one or more transceivers, a positioning report from a first UE; and transmit, via the one or more transceivers and to the first UE, an indication of a first reference RP for sensing operations based at least on the positioning report.

In an aspect, a UE includes one or more memories; one or more transceivers; and one or more processors communicatively coupled to the one or more memories and the one or more transceivers, the one or more processors, either alone or in combination, configured to: receive, via the one or more transceivers and from a network entity, an indication of a first reference TRP to use in a cooperative sensing scheme; and transmit, via the one or more transceivers, a sensing measurement report including one or more measurements associated with TOAs of arrival paths of the first reference TRP and one or more neighboring TRPs with respect to a reference time.

In an aspect, a network entity includes means for receiving a positioning report from a first UE; and means for transmitting, to the first UE, an indication of a first reference TRP for sensing operations based at least on the positioning report.

In an aspect, a UE includes means for receiving, from a network entity, an indication of a first reference TRP to use in a cooperative sensing scheme; and means for transmitting a sensing measurement report including one or more measurements associated with TOAs of arrival paths of the first reference TRP and one or more neighboring TRPs with respect to a reference time.

In an aspect, a non-transitory computer-readable medium stores computer-executable instructions that, when executed by a network entity, cause the network entity to: receive a positioning report from a first UE; and transmit, to the first UE, an indication of a first reference TRP for sensing operations based at least on the positioning report.

In an aspect, a non-transitory computer-readable medium stores computer-executable instructions that, when executed by a UE, cause the UE to: receive, from a network entity, an indication of a first reference TRP to use in a cooperative sensing scheme; and transmit a sensing measurement report including one or more measurements associated with TOAs of arrival paths of the first reference TRP and one or more neighboring TRPs with respect to a reference time.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

Figure 10:
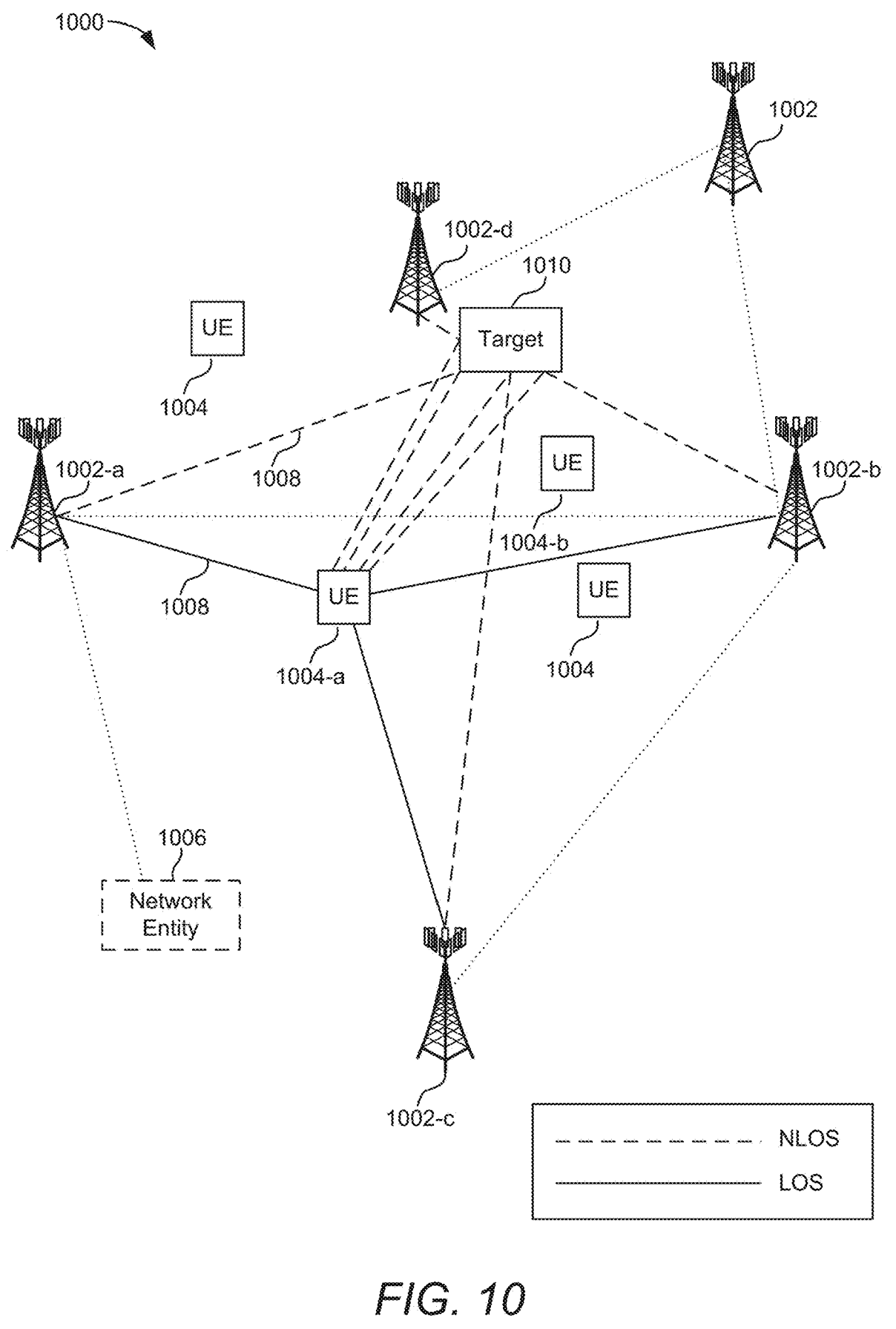

FIG. 10 illustrates an example of multi-UE, multi-TRP cooperative sensing that may be employed by a wireless communication system, according to aspects of the disclosure.

FIGS. 12 and 13 illustrate example methods of wireless communication, according to aspects of the disclosure.

DETAILED DESCRIPTION

Figure 1:
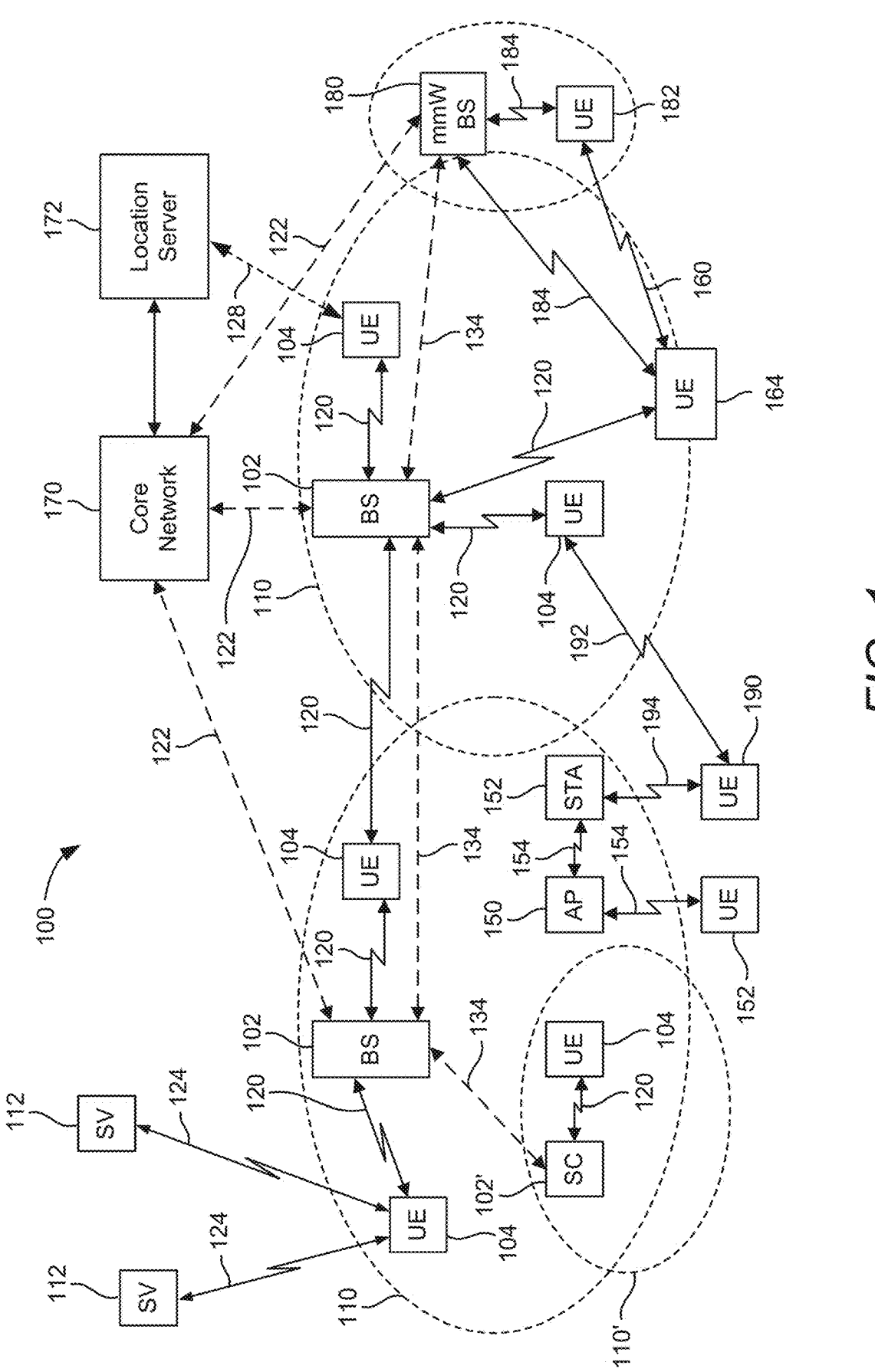
FIG. 1 illustrates an example wireless communication system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Various aspects relate generally to measurement and reporting for sensing operations. Some aspects more specifically relate to both positioning and sensing operations in NR. That is, for example, positioning techniques may be performed to determine locations of one or more devices a wireless communication system, and sensing measurement and reporting techniques may be performed utilizing the location information of the devices. In some examples, a wireless communication system may support (New Radio) NR positioning to accurately determine the geographical location or position of one or more user equipments (UEs) in a network. A transmission-reception point (TRP) may transmit positioning reference signals (PRSs) to a UE, and the one or more UEs may perform measurements on the PRSs and may report the measurements to the network. In some examples, the reported measurements may include time-of-arrival (TOA) and angle-of-arrival (AOA) measurements. The network entity or a centralized entity may use the measurements to compute a position of the one or more UEs in the network. In some examples, NR positioning may enable various location-based or position-based services and applications, including but not limited to sensing, navigation, tracking, etc.

In accordance with some aspects, NR sensing may correspond to sensing operations associated with passive objects, rather than active devices with which the network may communicate. That is, for example, in sensing operations, unlike NR positioning, the target object may not have any transmitter and/or receiver capabilities. In some cases, the same reference signals (e.g., positioning reference signals (PRS) and sounding reference signals (SRS)) may be used for both positioning and sensing. In some cases, the same configurations and protocols (e.g., Long Term Evolution (LTE) positioning protocol (LPP) and NR positioning protocol A (NRPPa)) may be used for both positioning and sensing. In some examples, the network may indicate to the UE which TRP to use in a sensing operation. That is, for example, by receiving a positioning report from the UE (e.g., after a positioning procedure has been performed with respect to the UE), the network may identify which TRP is a line-of-sight (LOS) TRP of the UE and which LOS TRP may be the best for the UE to use as a reference TRP in a cooperative sensing scheme with other TRPs and/or multiple UEs. In some examples, the network may also indicate a timing offset that the UE is to use to compensate for the propagation delay between the reference TRP and the UE that the UE may use in reporting sensing results.

Additionally, a UE may determine a reference time and report TOAs of non-LOS (NLOS) paths with respect to the reference time. At least some of the NLOS paths may correspond to one or more other TRPs different from the reference TRP. In some examples, the UE may refrain from sending a first arrival path (FAP) associated with one or more other TRPs. That is, for example, the UE may transmit one or more relative time difference reporting measurements corresponding to one or more NLOS paths to the network.

Particular aspects of the subject matter described in this disclosure can be implemented to realize one or more of the following potential advantages. In some examples, by the network identifying a reference TRP that has a LOS path to the UE, the described techniques can be used for effective cooperative sensing schemes by ensuring a more effective reference TRP is used for measurement and reporting of a target object. In some examples, by the UE transmitting a report with one or more relative time difference reporting measurements to the network, the described techniques can reduce the computation steps and time needed by the network to determine a position of a target object.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical TRP or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communication system 100, according to aspects of the disclosure. The wireless communication system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communication system 100 corresponds to an LTE network, or gNBs where the wireless communication system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., an LMF or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communication system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MULTEFIRE®.

The wireless communication system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., SRS) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the INTERNATIONAL TELECOMMUNICATION UNION® as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communication system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multifunctional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communication system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WI-FI DIRECT®, BLUETOOTH®, and so on.

Figure 2A:
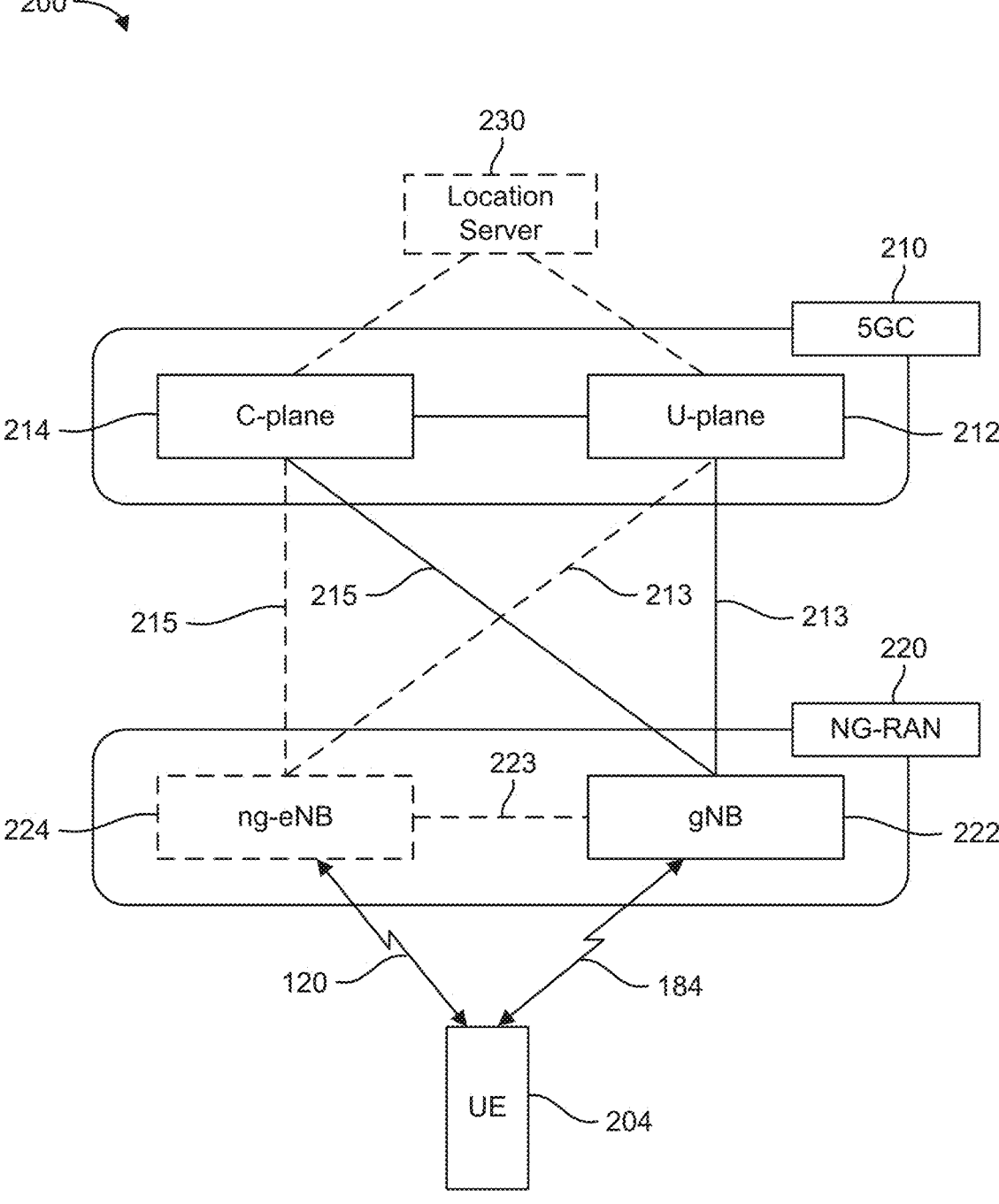
FIGS. 2A, 2B, and 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222.

Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
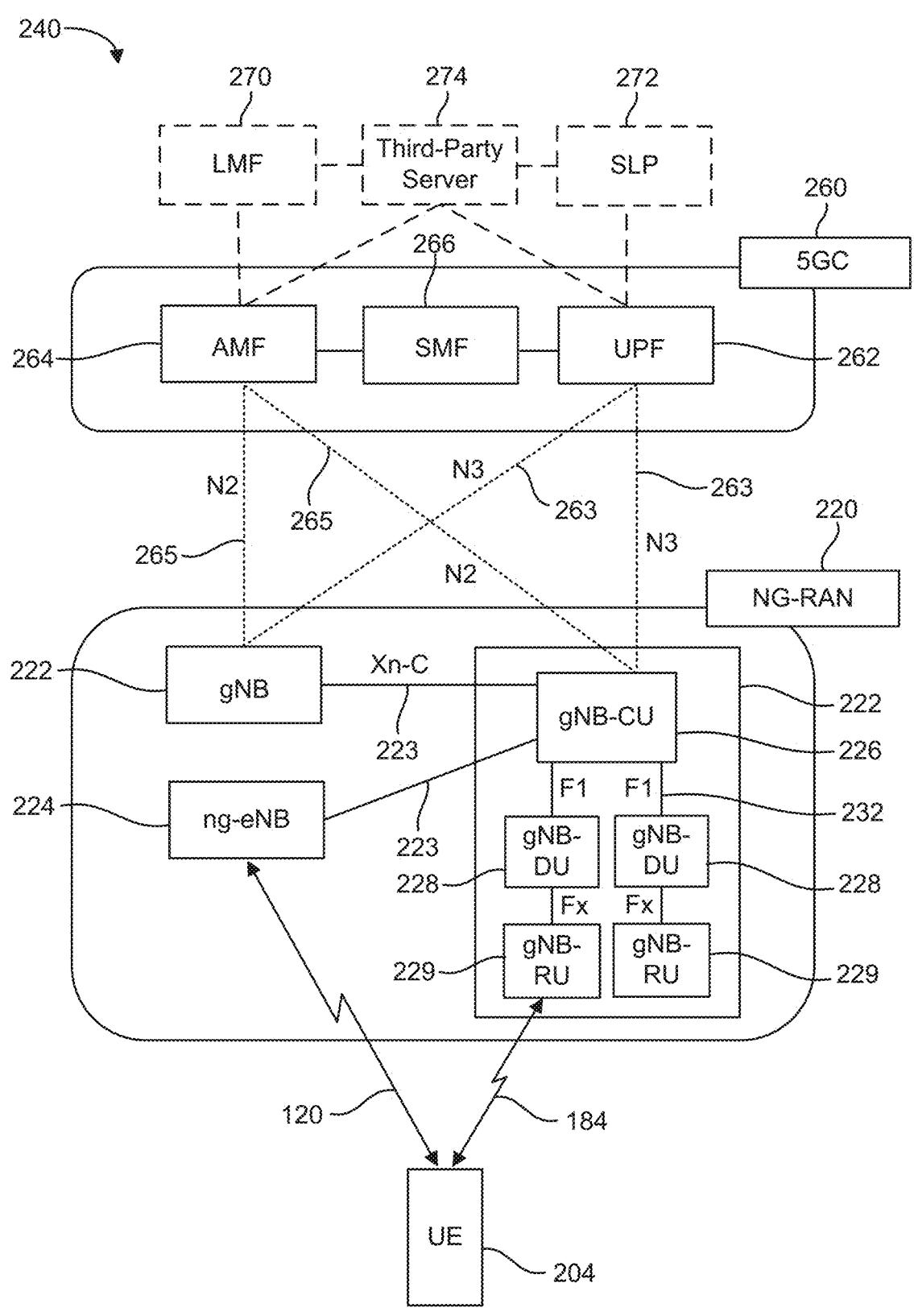

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP® (Third Generation Partnership Project) access networks.

Functions of the UPF 262 include acting as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR base station, 5G NB, access point (AP), a transmission-reception point (TRP), or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN ALLIANCE®)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
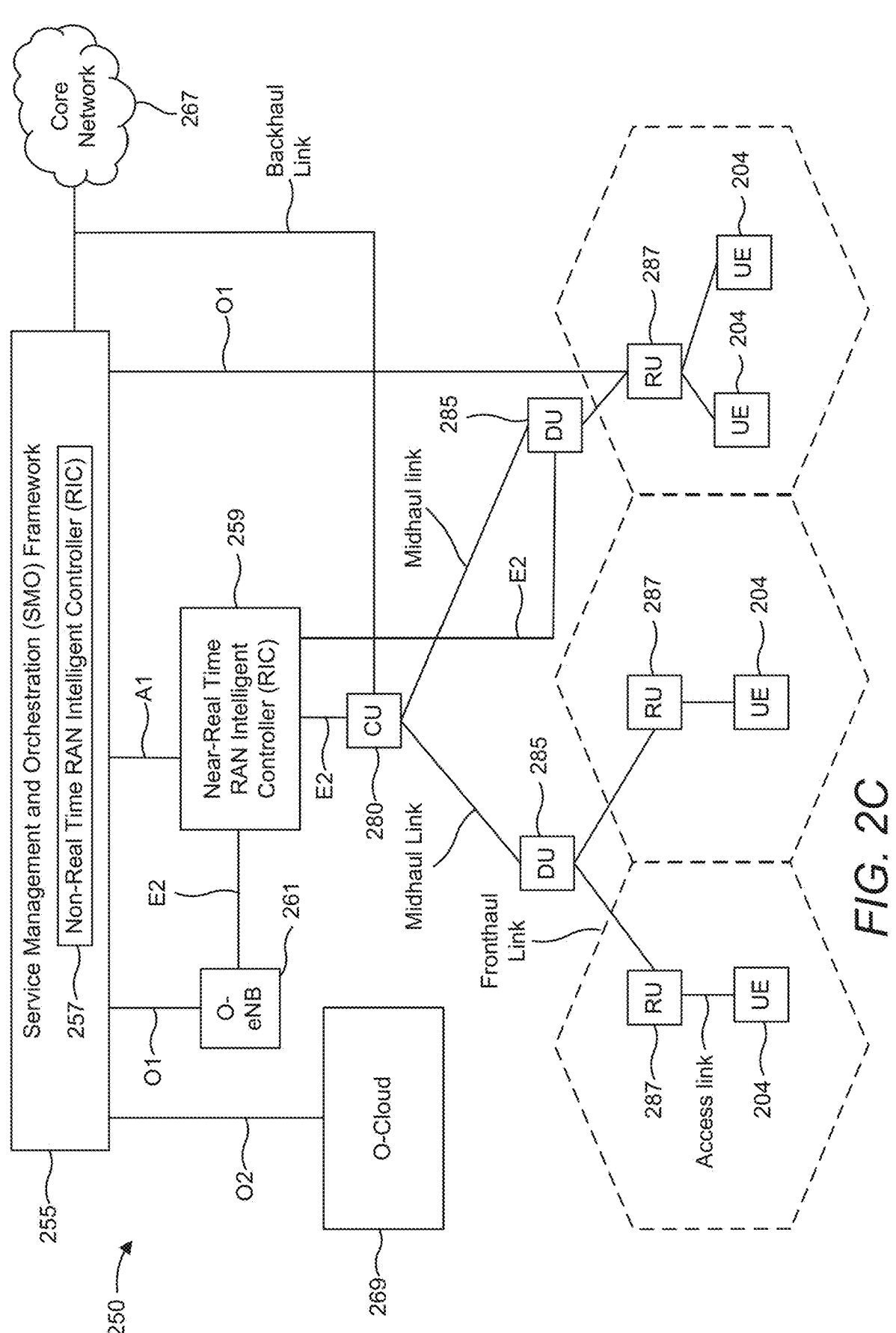

FIG. 2C illustrates an example disaggregated base station architecture 250, according to aspects of the disclosure. The disaggregated base station architecture 250 may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (RIC) 259 via an E2 link, or a Non-Real Time (Non-RT) RIC 257 associated with a Service Management and Orchestration (SMO) Framework 255, or both). A CU 280 may communicate with one or more DUs 285 (e.g., gNB-DUs 228) via respective midhaul links, such as an F1 interface. The DUs 285 may communicate with one or more radio units (RUS) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUS 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a RF transceiver), configured to receive or transmit signals, or both, over a wireless transmission medium to one or more of the other units.

In some aspects, the CU 280 may host one or more higher layer control functions. Such control functions can include RRC, PDCP, service data adaptation protocol (SDAP), or the like. Each control function can be implemented with an interface configured to communicate signals with other control functions hosted by the CU 280. The CU 280 may be configured to handle user plane functionality (i.e., Central Unit-User Plane (CU-UP)), control plane functionality (i.e., Central Unit-Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration. The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a RLC layer, a MAC layer, and one or more high PHY layers (such as modules for forward error correction (FEC) encoding and decoding, scrambling, modulation and demodulation, or the like) depending, at least in part, on a functional split, such as those defined by the 3rd Generation Partnership Project (3GPP®). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 interface). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUS 287 and Near-RT RICs 259. In some implementations, the SMO Framework 255 can communicate with a hardware aspect of a 4G RAN, such as an open eNB (O-eNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT RIC 257 may be configured to include a logical function that enables non-real-time control and optimization of RAN elements and resources, artificial intelligence/machine learning (AI/ML) workflows including model training and updates, or policy-based guidance of applications/features in the Near-RT RIC 259. The Non-RT RIC 257 may be coupled to or communicate with (such as via an A1 interface) the Near-RT RIC 259. The Near-RT RIC 259 may be configured to include a logical function that enables near-real-time control and optimization of RAN elements and resources via data collection and actions over an interface (such as via an E2 interface) connecting one or more CUs 280, one or more DUs 285, or both, as well as an O-eNB, with the Near-RT RIC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Framework 255 or the Non-RT RIC 257 from non-network data sources or from network functions. In some examples, the Non-RT RIC 257 or the Near-RT RIC 259 may be configured to tune RAN behavior or performance. For example, the Non-RT RIC 257 may monitor long-term trends and patterns for performance and employ AI/ML models to perform corrective actions through the SMO Framework 255 (such as reconfiguration via O1) or via creation of RAN management policies (such as A1 policies).

Figure 3A:
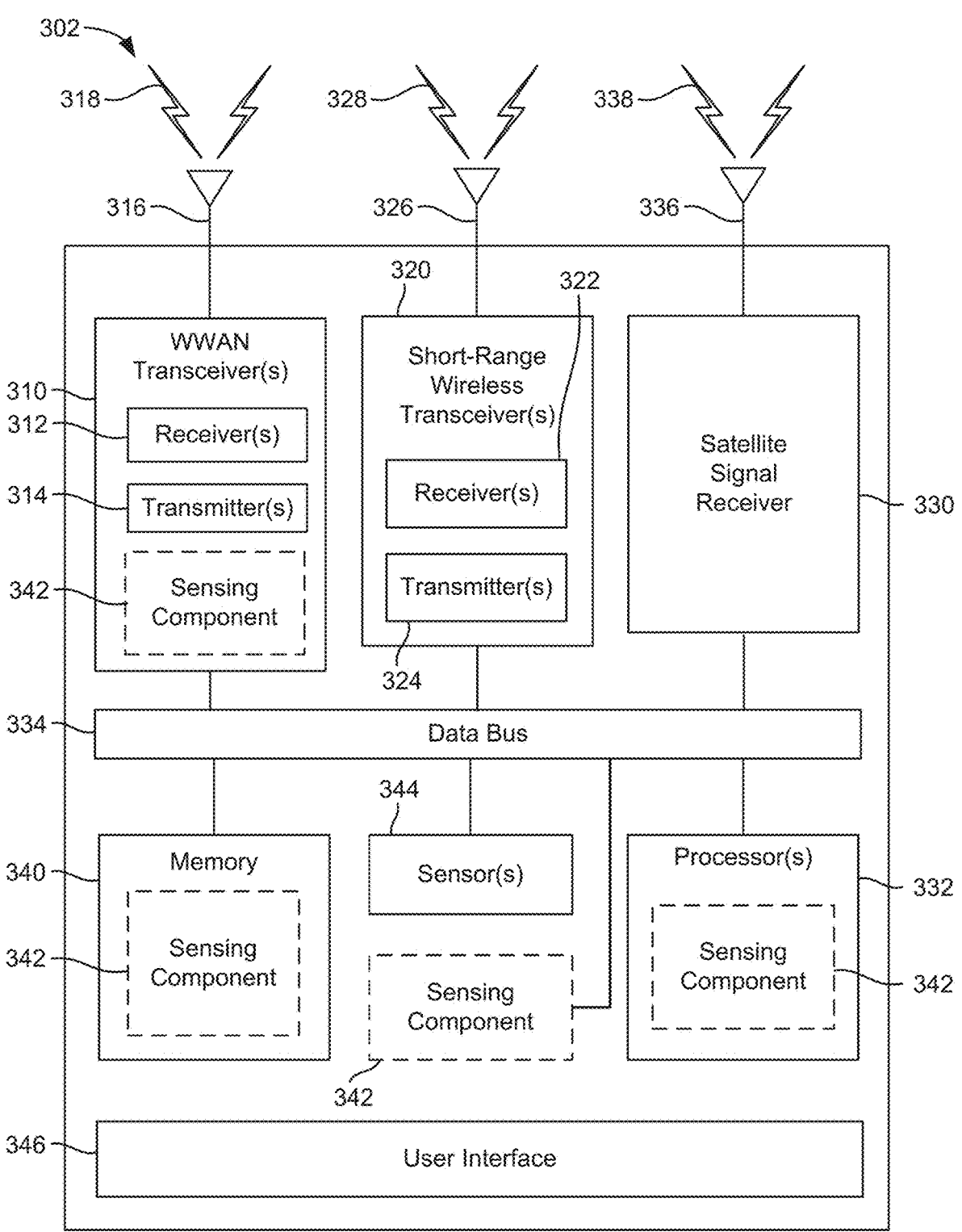
FIGS. 3A, 3B, and 3C are simplified block diagrams of several sample aspects of components that may be employed in a user equipment (UE), a base station, and a network entity, respectively, and configured to support communications as taught herein.
Figure 3B:
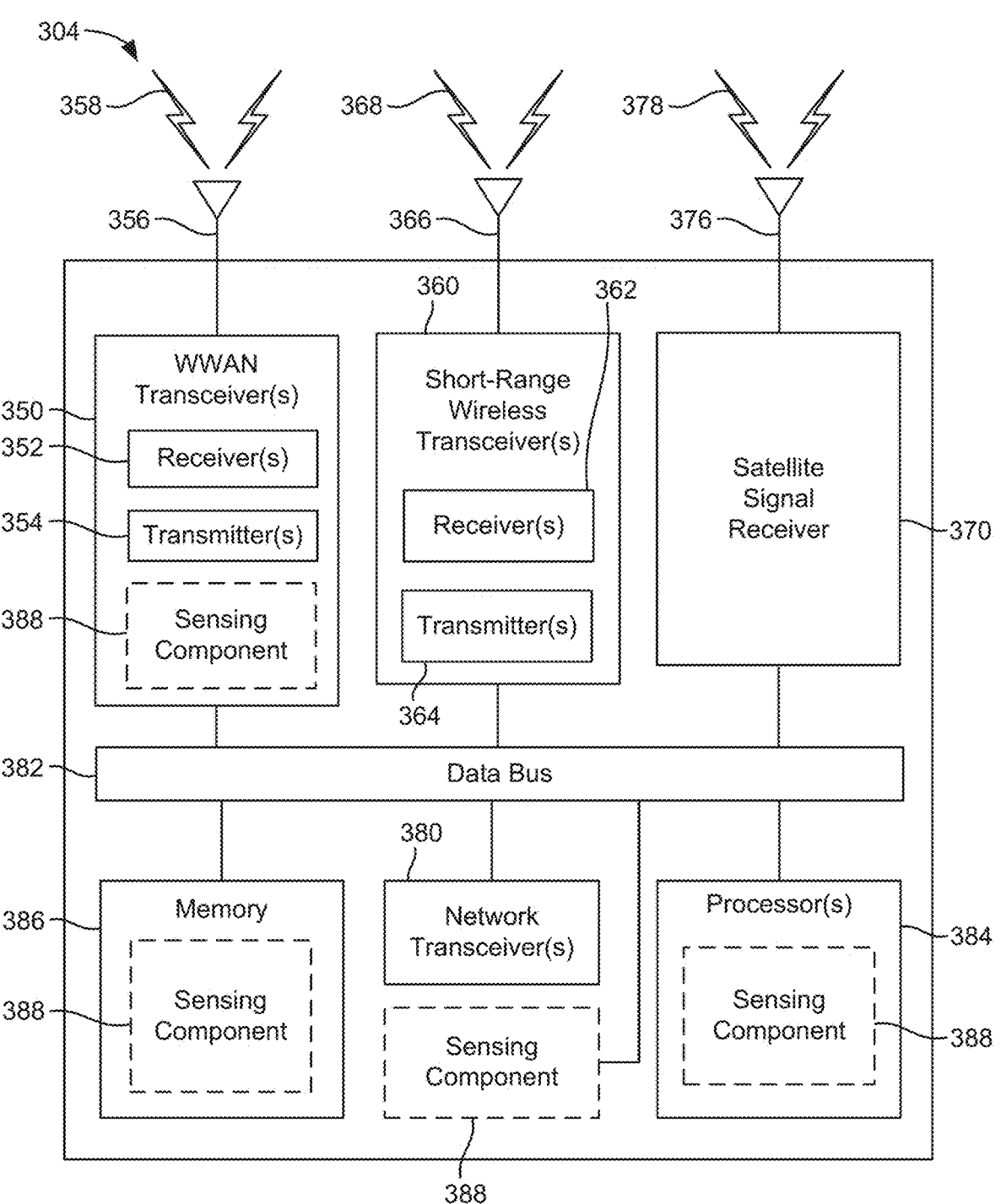
Figure 3C:
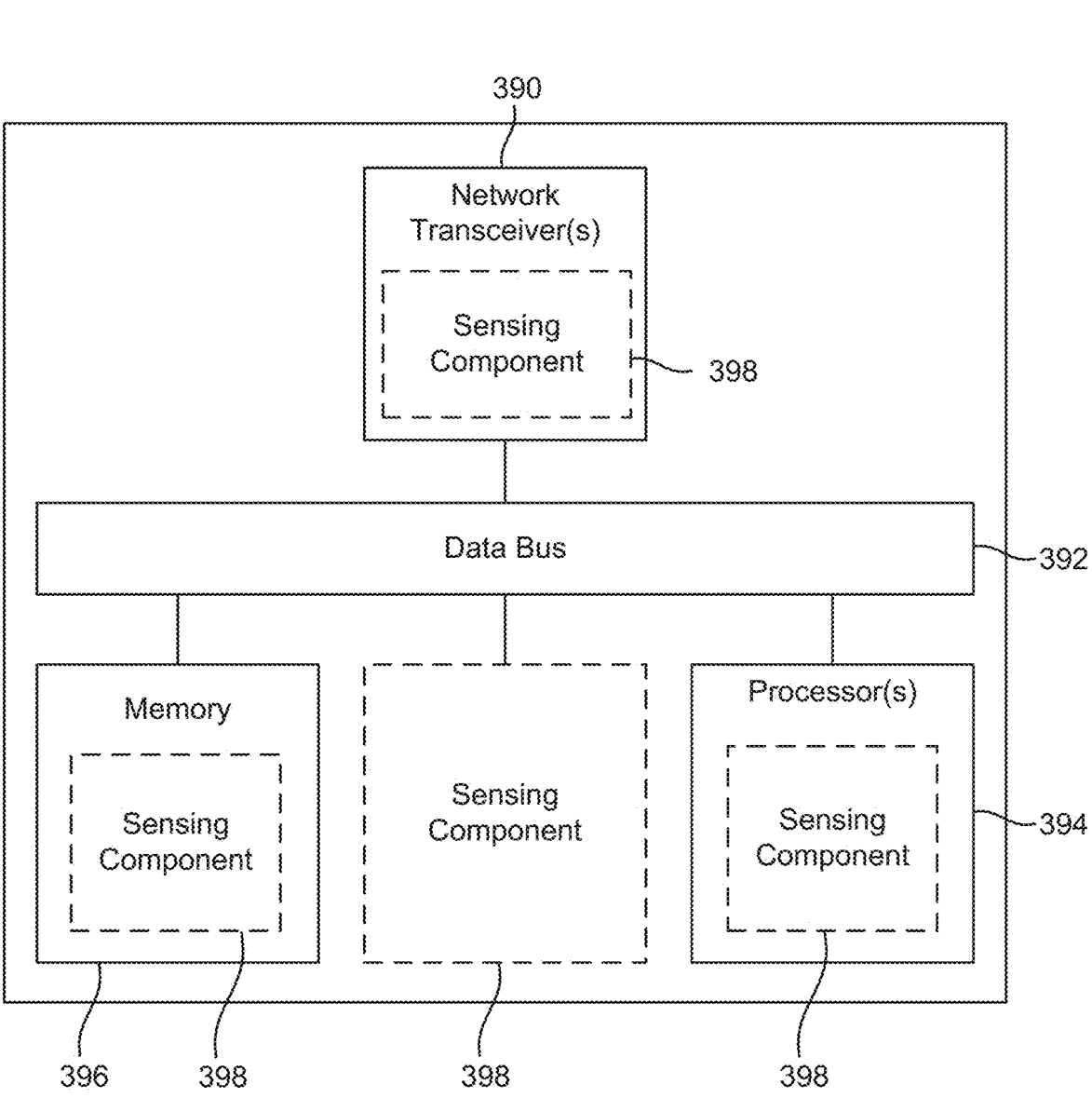

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/ frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., Wi-Fi, LTE Direct, BLUETOOTH®, ZIGBEE®, Z-WAVE®, PC5, dedicated short-range communications (DSRC), wireless access for vehicular environments (WAVE), near-field communication (NFC), ultra-wideband (UWB), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be Wi-Fi transceivers, BLUETOOTH® transceivers, ZIGBEE® and/or Z-WAVE® transceivers, NFC transceivers, UWB transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS®) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include sensing component 342, 388, and 398, respectively. The sensing component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the sensing component 342, 388, and 398 may be external to the processors 332, 384, and 394 (e.g., part of a modem processing system, integrated with another processing system, etc.). Alternatively, the sensing component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the sensing component 342, which may be, for example, part of the one or more WWAN transceivers 310, the memory 340, the one or more processors 332, or any combination thereof, or may be a standalone component. FIG. 3B illustrates possible locations of the sensing component 388, which may be, for example, part of the one or more WWAN transceivers 350, the memory 386, the one or more processors 384, or any combination thereof, or may be a standalone component. FIG. 3C illustrates possible locations of the sensing component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging. RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the downlink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or personal computer (PC) or laptop may have Wi-Fi and/or BLUETOOTH® capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite signal receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the sensing component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as Wi-Fi).

Figure 4:
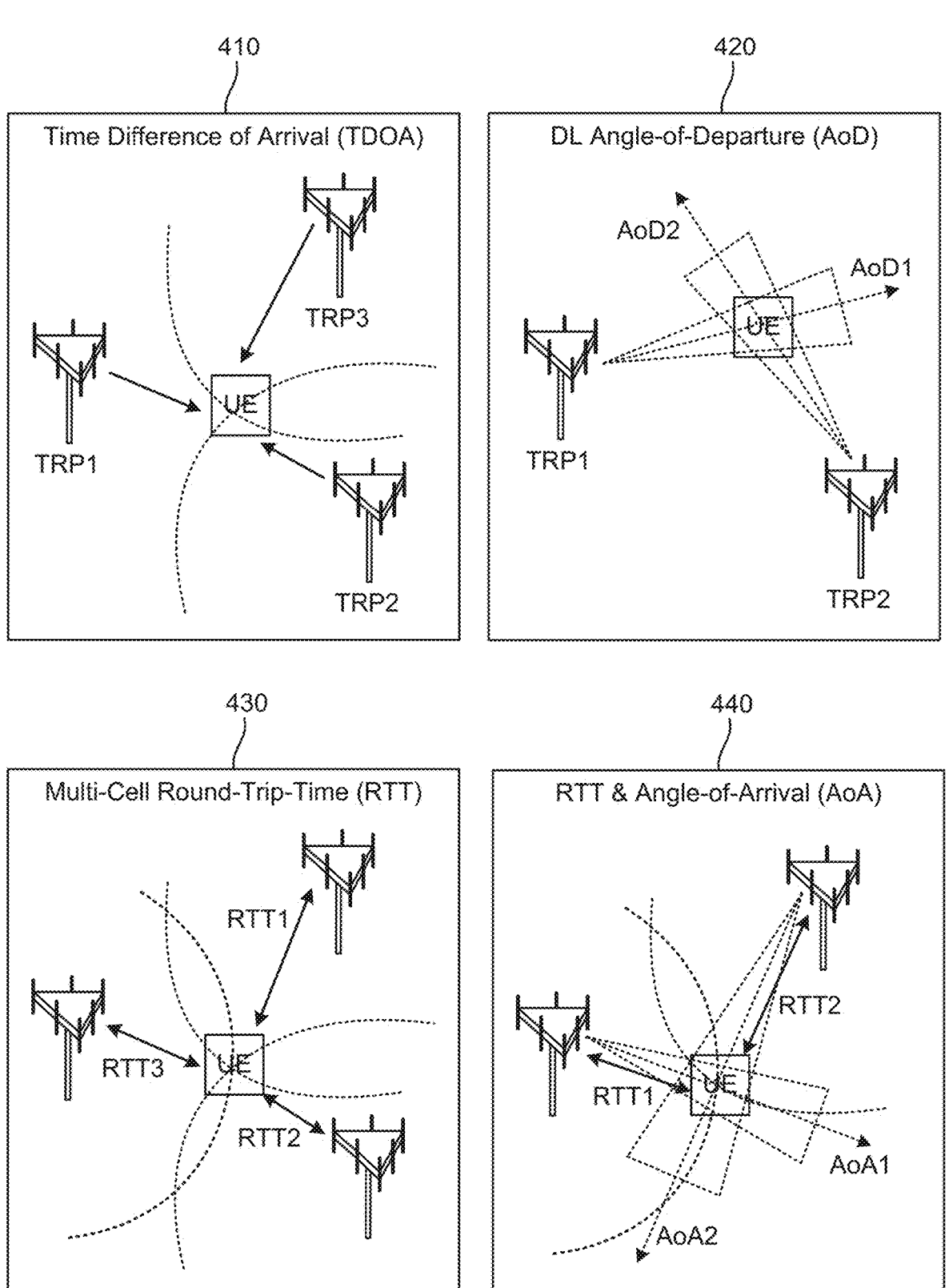
FIG. 4 illustrates examples of various positioning methods supported in New Radio (NR), according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 4 illustrates examples of various positioning methods, according to aspects of the disclosure. In an OTDOA or DL-TDOA positioning procedure, illustrated by scenario 410, a UE measures the differences between the times of arrival (ToAs) of reference signals (e.g., PRS) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, illustrated by scenario 420, the positioning entity uses a measurement report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE to multiple base stations. Specifically, a UE transmits one or more uplink reference signals that are measured by a reference base station and a plurality of non-reference base stations. Each base station then reports the reception time (referred to as the relative time of arrival (RTOA)) of the reference signal(s) to a positioning entity (e.g., a location server) that knows the locations and relative timing of the involved base stations. Based on the reception-to-reception (Rx-Rx) time difference between the reported RTOA of the reference base station and the reported RTOA of each non-reference base station, the known locations of the base stations, and their known timing offsets, the positioning entity can estimate the location of the UE using TDOA.

For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest slot boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, illustrated by scenario 430, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy, as illustrated by scenario 440.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive slots including PRS, periodicity of the consecutive slots including PRS, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (µs). In some cases, when any of the resources used for the positioning measurement are in FR1, the value range for the uncertainty of the expected RSTD may be +/−32 µs. In other cases, when all of the resources used for the positioning measurement(s) are in FR2, the value range for the uncertainty of the expected RSTD may be +/−8 µs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

In some examples, LPP is used point-to-point between a location server (e.g., LMF 270) and a target device (e.g., a UE) in order to position the target device using position-related measurements obtained by one or more reference sources (physical entities or parts of physical entities that provide signals that can be measured by a target device in order to obtain the location of the target device). An LPP session is used between a location server and a target device in order to obtain location-related measurements or a location estimate or to transfer assistance data. Currently, a single LPP session is used to support a single location request and multiple LPP sessions can be used between the same endpoints to support multiple different location requests. Each LPP session comprises one or more LPP transactions (or procedures), with each LPP transaction performing a single operation (capability exchange, assistance data transfer, or location information transfer). Each LPP transaction involves the exchange of one or more LPP messages between the location server and the target device. The general format of an LPP message consists of a set of common fields followed by a body. The body (which may be empty) contains information specific to a particular message type. Each message type contains information specific to one or more positioning methods and/or information common to all positioning methods.

An LPP session generally includes at least a capability transfer or indication procedure, an assistance data transfer or delivery procedure, and a location information transfer or delivery procedure. In accordance with some aspects, an example LPP capability transfer procedure, LPP assistance data transfer procedure, and LPP location information transfer procedure between a target device and a location server may be performed.

The purpose of an LPP capability transfer procedure is to enable the transfer of capabilities from the target device (e.g., a UE 204) to the location server (e.g., an LMF 270). Capabilities in this context refer to positioning and protocol capabilities related to LPP and the positioning methods supported by LPP. In the LPP capability transfer procedure, the location server (e.g., an LMF 270) indicates the types of capabilities needed from the target device (e.g., UE 204) in an LPP Request Capabilities message. The target device responds with an LPP Provide Capabilities message. The capabilities included in the LPP Provide Capabilities message should correspond to any capability types specified in the LPP Request Capabilities message. Specifically, for each positioning method for which a request for capabilities is included in the LPP Request Capabilities message, if the target device supports this positioning method, the target device includes the capabilities of the target device for that supported positioning method in the LPP Provide Capabilities message. For an LPP capability indication procedure, the target device provides unsolicited (i.e., without receiving an LPP Request Capabilities message) capabilities to the location server in an LPP Provide Capabilities message.

The purpose of an LPP assistance data transfer procedure is to enable the target device to request assistance data from the location server to assist in positioning, and to enable the location server to transfer assistance data to the target device in the absence of a request. In the LPP assistance data transfer procedure, the target device sends an LPP Request Assistance Data message to the location server. The location server responds to the target device with an LPP Provide Assistance Data message containing assistance data. The transferred assistance data should match or be a subset of the assistance data requested in the LPP Request Assistance Data. The location server may also provide any not requested information that it considers useful to the target device. The location server may also transmit one or more additional LPP Provide Assistance Data messages to the target device containing further assistance data. For an LPP assistance data delivery procedure, the location server provides unsolicited assistance data necessary for positioning. The assistance data may be provided periodically or non-periodically.

The purpose of an LPP location information transfer procedure is to enable the location server to request location measurement data and/or a location estimate from the target device, and to enable the target device to transfer location measurement data and/or a location estimate to a location server in the absence of a request. In an LPP location information transfer procedure, the location server sends an LPP Request Location Information message to the target device to request location information, indicating the type of location information needed and potentially the associated QoS. The target device responds with an LPP Provide Location Information message to the location server to transfer location information. The location information transferred should match or be a subset of the location information requested by the LPP Request Location Information unless the location server explicitly allows additional location information. More specifically, if the requested information is compatible with the target device's capabilities and configuration, the target device includes the requested information in an LPP Provide Location Information message. Otherwise, if the target device does not support one or more of the requested positioning methods, the target device continues to process the message as if it contained only information for the supported positioning methods and handles the signaling content of the unsupported positioning methods by LPP error detection. If requested by the LPP Request Lactation Information message, the target device sends additional LPP Provide Location Information messages to the location server to transfer additional location information. An LPP location information delivery procedure supports the delivery of positioning estimations based on unsolicited service.

LPP also defines procedures related to error indication for when a receiving endpoint (target device or location server) receives erroneous or unexpected data or detects that certain data are missing. Specifically, when a receiving endpoint determines that a received LPP message contains an error, it can return an Error message to the transmitting endpoint indicating the error or errors and discard the received/erroneous message. If the receiving endpoint is able to determine that the erroneous LPP message is an LPP Error or Abort Message, then the receiving endpoint discards the received message without returning an Error message to the transmitting endpoint.

LPP also defines procedures related to abort indication to allow a target device or location server to abort an ongoing procedure due to some unexpected event (e.g., cancellation of a location request by an LCS client). An Abort procedure can also be used to stop an ongoing procedure (e.g., periodic location reporting from the target device). In an Abort procedure, a first endpoint determines that procedure P must be aborted and sends an Abort message to a second endpoint carrying the transaction ID for procedure P. The second endpoint then aborts procedure P.

Wireless communication signals (e.g., radio frequency (RF) signals configured to carry orthogonal frequency division multiplexing (OFDM) symbols in accordance with a wireless communications standard, such as LTE, NR, etc.) transmitted between a UE and a base station can be used for environment sensing (also referred to as "RF sensing" or "radar"). Using wireless communication signals for environment sensing can be regarded as consumer-level radar with advanced detection capabilities that enable, among other things, touchless/device-free interaction with a device/ system. The wireless communication signals may be cellular communication signals, such as LTE or NR signals, WLAN signals, such as Wi-Fi signals, etc. As a particular example, the wireless communication signals may be an OFDM waveform as utilized in LTE and NR. High-frequency communication signals, such as millimeter wave (mmW) RF signals, are especially beneficial to use as radar signals because the higher frequency provides, at least, more accurate range (distance) detection.

Possible use cases of RF sensing include health monitoring use cases, such as heartbeat detection, respiration rate monitoring, and the like, gesture recognition use cases, such as human activity recognition, keystroke detection, sign language recognition, and the like, contextual information acquisition use cases, such as location detection/tracking, direction finding, range estimation, and the like, and automotive radar use cases, such as smart cruise control, collision avoidance, and the like.

Figure 5A:
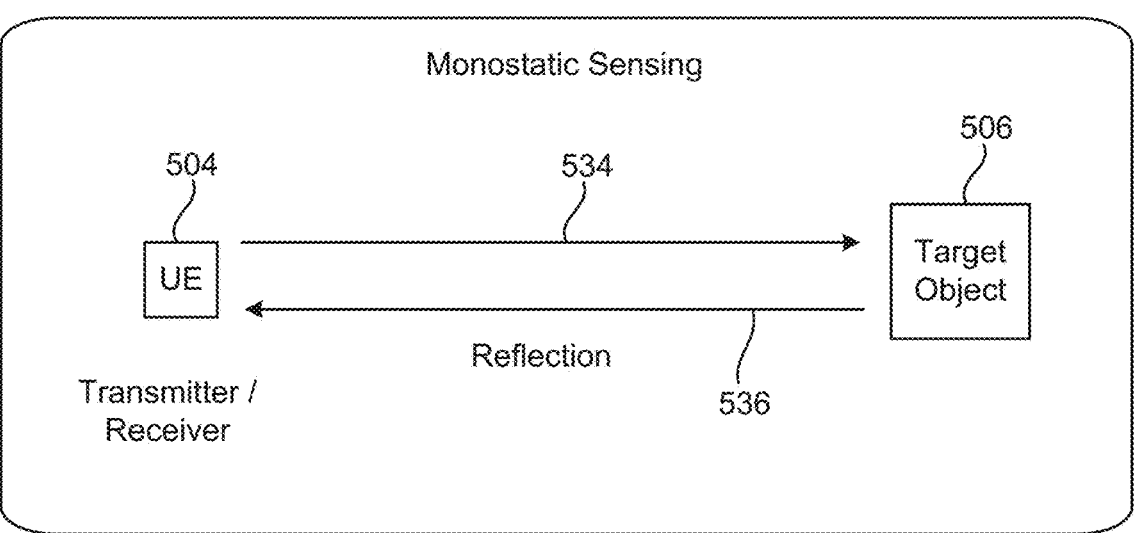
FIGS. 5A and 5B illustrate different types of radar, according to aspects of the disclosure.
Figure 5B:
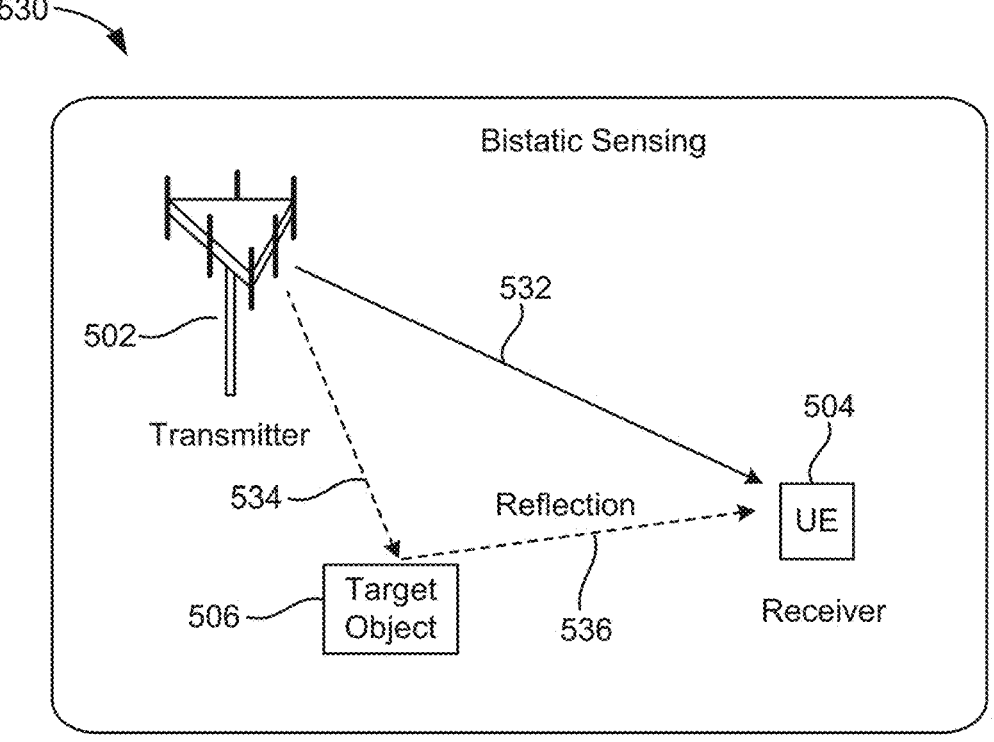

There are different types of sensing, including monostatic sensing (also referred to as "active sensing") and bistatic sensing (also referred to as "passive sensing"). FIGS. 5A and 5B illustrate these different types of sensing. Specifically, FIG. 5A is a diagram 500 illustrating a monostatic sensing scenario and FIG. 5B is a diagram 530 illustrating a bistatic sensing scenario. In FIG. 5A, the transmitter (Tx) and receiver (Rx) are co-located in the same sensing device 504 (e.g., a UE). The sensing device 504 transmits one or more RF sensing signals 534 (e.g., uplink or sidelink positioning reference signals (PRS) where the sensing device 504 is a UE), and some of the RF sensing signals 534 reflect off a target object 506. The sensing device 504 can measure various properties (e.g., times of arrival (ToAs), angles of arrival (AoAs), phase shift, etc.) of the reflections 536 of the RF sensing signals 534 to determine characteristics of the target object 506 (e.g., size, shape, speed, motion state, etc.).

In FIG. 5B, the transmitter (Tx) and receiver (Rx) are not co-located, that is, they are separate devices (e.g., a UE and a base station). Note that while FIG. 5B illustrates using a downlink RF signal as the RF sensing signal 532, uplink RF signals or sidelink RF signals can also be used as RF sensing signals 532. In a downlink scenario, as shown, the transmitter is a base station and the receiver is a UE, whereas in an uplink scenario, the transmitter is a UE and the receiver is a base station.

Referring to FIG. 5B in greater detail, the transmitter device 502 transmits RF sensing signals 532 and 534 (e.g., positioning reference signals (PRS)) to the sensing device 504, but some of the RF sensing signals 534 reflect off a target object 506. The sensing device 504 (also referred to as the "sensing device") can measure the times of arrival (ToAs) of the RF sensing signals 532 received directly from the transmitter device and the ToAs of the reflections 536 of the RF sensing signals 534 reflected from the target object 506.

More specifically, as described above, a transmitter device (e.g., a base station) may transmit a single RF signal or multiple RF signals to a sensing device (e.g., a UE). However, the receiver may receive multiple RF signals corresponding to each transmitted RF signal due to the propagation characteristics of RF signals through multipath channels. Each path may be associated with a cluster of one or more channel taps. Generally, the time at which the receiver detects the first cluster of channel taps is considered the ToA of the RF signal on the line-of-site (LOS) path (i.e., the shortest path between the transmitter and the receiver). Later clusters of channel taps are considered to have reflected off objects between the transmitter and the receiver and therefore to have followed non-LOS (NLOS) paths between the transmitter and the receiver.

Thus, referring back to FIG. 5B, the RF sensing signals 532 followed the LOS path between the transmitter device 502 and the sensing device 504, and the RF sensing signals 534 followed an NLOS path between the transmitter device 502 and the sensing device 504 due to reflecting off the target object 506. The transmitter device 502 may have transmitted multiple RF sensing signals 532, 534, some of which followed the LOS path and others of which followed the NLOS path. Alternatively, the transmitter device 502 may have transmitted a single RF sensing signal in a broad enough beam that a portion of the RF sensing signal followed the LOS path (RF sensing signal 532) and a portion of the RF sensing signal followed the NLOS path (RF sensing signal 534).

Based on the ToA of the LOS path, the ToA of the NLOS path, and the speed of light, the sensing device 504 can determine the distance to the target object(s). For example, the sensing device 504 can calculate the distance to the target object as the difference between the ToA of the LOS path and the ToA of the NLOS path multiplied by the speed of light. In addition, if the sensing device 504 is capable of receive beamforming, the sensing device 504 may be able to determine the general direction to a target object as the direction (angle) of the receive beam on which the RF sensing signal following the NLOS path was received. That is, the sensing device 504 may determine the direction to the target object as the angle of arrival (AoA) of the RF sensing signal, which is the angle of the receive beam used to receive the RF sensing signal. The sensing device 504 may then optionally report this information to the transmitter device 502, its serving base station, an application server associated with the core network, an external client, a third-party application, or some other sensing entity. Alternatively, the sensing device 504 may report the ToA measurements to the transmitter device 502, or other sensing entity (e.g., if the sensing device 504 does not have the processing capability to perform the calculations itself), and the transmitter device 502 may determine the distance and, optionally, the direction to the target object 506.

Note that if the RF sensing signals are uplink RF signals transmitted by a UE to a base station, the base station would perform object detection based on the uplink RF signals just like the UE does based on the downlink RF signals.

Like conventional radar, wireless communication-based radar signal can be used to estimate the range (distance), velocity (Doppler), and angle (AoA) of a target object. However, the performance (e.g., resolution and maximum values of range, velocity, and angle) may depend on the design of the reference signal.

Aspects of the disclosure relate to techniques for measurement and reporting for NR wireless sensing operations. In NR and various wireless communication networks, different techniques may be used for various positioning operations. For example, DL-TDOA, DL-AOD, Multi-RTT, and E-CID may be used as positioning techniques for various network designs and implementations. Due to the nature of these different techniques, however, each positioning technique may require a corresponding type of measurement and/or reporting procedure. Similarly, in NR and various wireless communication networks, different sensing techniques may be used for various sensing operations. For example, spherical/ellipsoid/paraboloid-based sensing techniques may be used for sensing operations. Due to the nature of these different sensing techniques, each sensing technique may require a corresponding type of measurement and/or reporting procedure.

Moreover, the measurement and/or reporting procedures associated with sensing operations may be different from those associated with positioning operations. For example, in sensing operations, the target object may not have any transmission or capabilities. That is, for example, the target object may be a passive object in some sensing operation scenarios. For example, the same reference signals (e.g., PRS and SRS) may be used for both positioning and sensing procedures. Additionally, or alternatively, the same configurations and protocols (e.g., LPP and NRPPa) may be used for both positioning and sensing procedures.

However, to minimize the sensing procedure workload on various network devices, the existing positioning procedure and framework may be enhanced to support sensing operations, for example, in NR wireless communication systems.

While sensing operations may share some similar attributes with positioning operations, some existing positioning procedures (e.g., DL-TDOA) may be inaccurate or inefficient when used for sensing operations. These deficiencies in the existing positioning measurement and reporting procedures need to be addressed when applied to sensing operations. That is, for example, the additional processing required to be performed by the sensing device to utilize the existing positioning measurement and reporting procedures may be excessive or impractical for certain sensing devices. Accordingly, new techniques for measurement and reporting for sensing operations may be employed in wireless communication systems as described herein.

Figure 6:
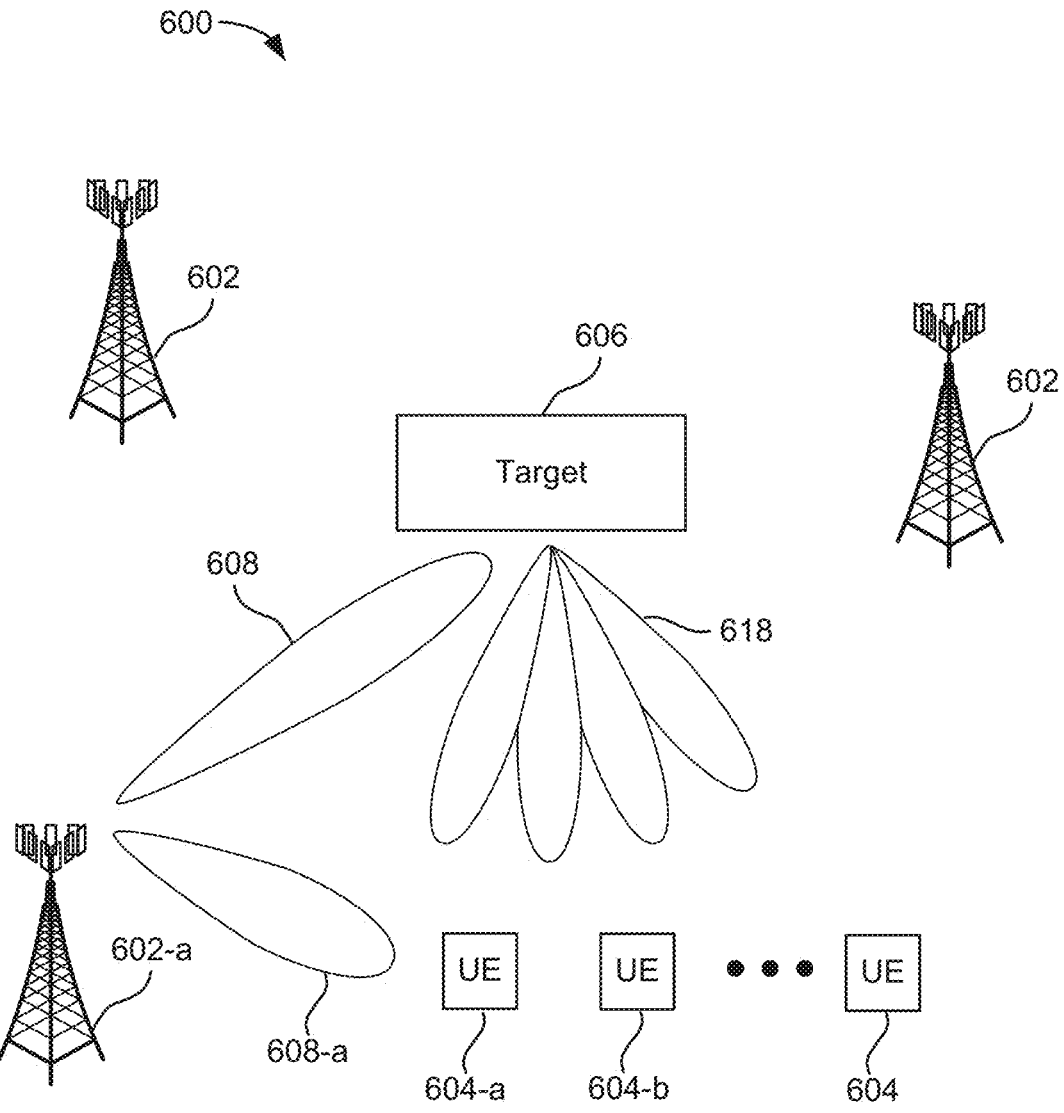
FIG. 6 illustrates an example of multi-UE cooperative sensing that may be employed by a wireless communication system, according to aspects of the disclosure.

FIG. 6 illustrates an example of multi-UE cooperative sensing in the context of an example wireless communication system 600, according to aspects of the disclosure. In certain aspects, wireless communication system 600 is an example of, or includes aspects of, the corresponding elements described with reference to FIGS. 1-5B and 7A-11. In some examples, wireless communication system 600 includes TRPs 602, UEs 604, a target 606, sensing signal 608, and reflected sensing signal(s) 618.

A first TRP 602-a may transmit a sensing signal 608 towards a target 606 in the vicinity of a first UE 604-a and a second UE 604-b. In some examples, the first TRP 602-a may transmit the sensing signal 608 along with other sensing signals using different beams (e.g., beam-sweeping) in the direction of the target 606. The target 606 may reflect or scatter 618 the sensing signal 608 from the first TRP 602-a. One or more of the different beams from the first TRP 602-a may have a line-of-sight (LOS) path to a UE 604 (e.g., the first UE 604-a). These beams may be referred to as an LOS sensing signal 608-a. In some cases, a target material of the target 606 may be rough enough to provide adequate reflection of a radio frequency signal (e.g., a specular or scattered reflection). The first UE 604-a and the second UE 604-b may receive the reflections 618 or the sensing signal 608 from the target 606 using different receive beams. The reflected sensing signal 618 reflected by the target 606 may be referred to as a non-LOS (NLOS) sensing signal.

In some examples, once the first UE 604-a and the second UE 604-b receive the reflected sensing signal 618 from the first TRP 602-a, the first UE 604-a and the second UE 604-b may perform measurements on the reflected sensing signal 618 and may report the measurements to a network (e.g., via first TRP 602-a). Because the positions of the UEs 604 may be known by the network (e.g., via NR positioning of the UEs 604), the network or a centralized sensing entity may process the measurements received from the UEs 604 (e.g., jointly process the measurements from multiple UEs 604) and estimate the position of the target 606. The sensing described with reference to FIG. 6 may be referred to as bistatic sensing (and as discussed herein with respect to FIG. 5B), since the transmitter of the sensing signal 608 (e.g., the first TRP 602-a) is separate from each receiver of the sensing signal 608 or reflected sensing signals 618 (e.g., the first UE 604-a and the second UE 604-b). In some examples, other TRPs 602 or devices may similarly transmit sensing signals towards the target 606 and those reflected signals may also be received by the first UE 604-a and the second UE 604-b, as well as other UEs 604 in a coordinated sensing scheme.

Figure 7A:
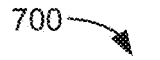
FIG. 7A illustrates an example of multi-transmission-reception point (TRP) cooperative sensing that may be employed by a wireless communication system, according to aspects of the disclosure.

FIG. 7A illustrates an example of multi-TRP cooperative sensing in the context of an example wireless communication system 700, according to aspects of the disclosure. In certain aspects, wireless communication system 700 is an example of, or includes aspects of, the corresponding elements described with reference to FIGS. 1-6 and 7B-11. In some examples, wireless communication system 700 includes TRP 702-a, TRP 702-b, TRP 702-c, UE 704, target 706, direct path 708, reflected path 710.

In some examples, a first TRP 702-a, a second TRP 702-b, and a third TRP 702-c may transmit sensing signals directly to a UE 704 and indirectly via reflections from a target 706. In some cases, the TRPs 702 may be synchronized based on a common reference time, and sensing reference signal transmissions at the TRPs 702 may be synchronized. The UE 704 may receive the sensing signals from the TRPs 702, perform measurements on the sensing signals, and report the measurements to a network. The measurements may include time of arrival (TOA) values of reflected paths between the UE 704 and the TRPs 702. In some examples, there may be two paths that the UE 704 may measure for each TRP 702: the LOS or direct path 708 (e.g., $R_{1-U}$ for the first TRP 702-a) and the NLOS or reflected path 710 via the target 706 (e.g., $R_{1-T}$ plus $R_{T-U}$ for the first TRP 702-a). The network may then use the measurements to determine a position of the target 706.

In some examples, a network entity may determine a length of the reflected path 710 between the first TRP 702-a and the UE 704 based on the measurements received from the UE 704. That is, for example, the network may use the following equation to determine the length of the reflected path 710: $R_{1-T-U} = R_{1-T} + R_{T-U} = c \cdot T_{1-T-U}$. $R_{1-T-U}$ may be the length of the reflected path between the first TRP 702-a and the UE 704. $R_{1-T}$ may be the length of the path between the first TRP 702-a and the target 706, $R_{T-U}$ may be the length of the path between the target 706 and the UE 704, c may be the speed of light, and $T_{1-T-U}$ may be the TOA of a sensing signal received by the UE 704 on the reflected path 710. Because C is known, and $T_{1-T-U}$ may be included in the measurements received from the UE 704, the network may be able to determine $R_{1-T-U}$.

Thus, the direct paths between the UE 704 and the TRPs 702 (e.g., the LOS paths) and reflected paths between the UE 704 and the TRPs 702 may be resolvable at the UE 704. Similar equations may be used to determine the length of the reflected paths between the UE 704 and the second TRP 702-b and the third TRP 702-c (e.g., $R_{2-T-U} = R_{2-T} + R_{T-U} = c \cdot T_{2-T-U}$ and $R_{3-T-U} = R_{3-T} + R_{T-U} = c \cdot T_{3-T-U}$). Once the network determines the length of the reflected paths between the UE 704 and the TRPs 702, the network may be able to determine the position of the target 706, for example, as described with reference to FIG. 8.

Figure 7B:
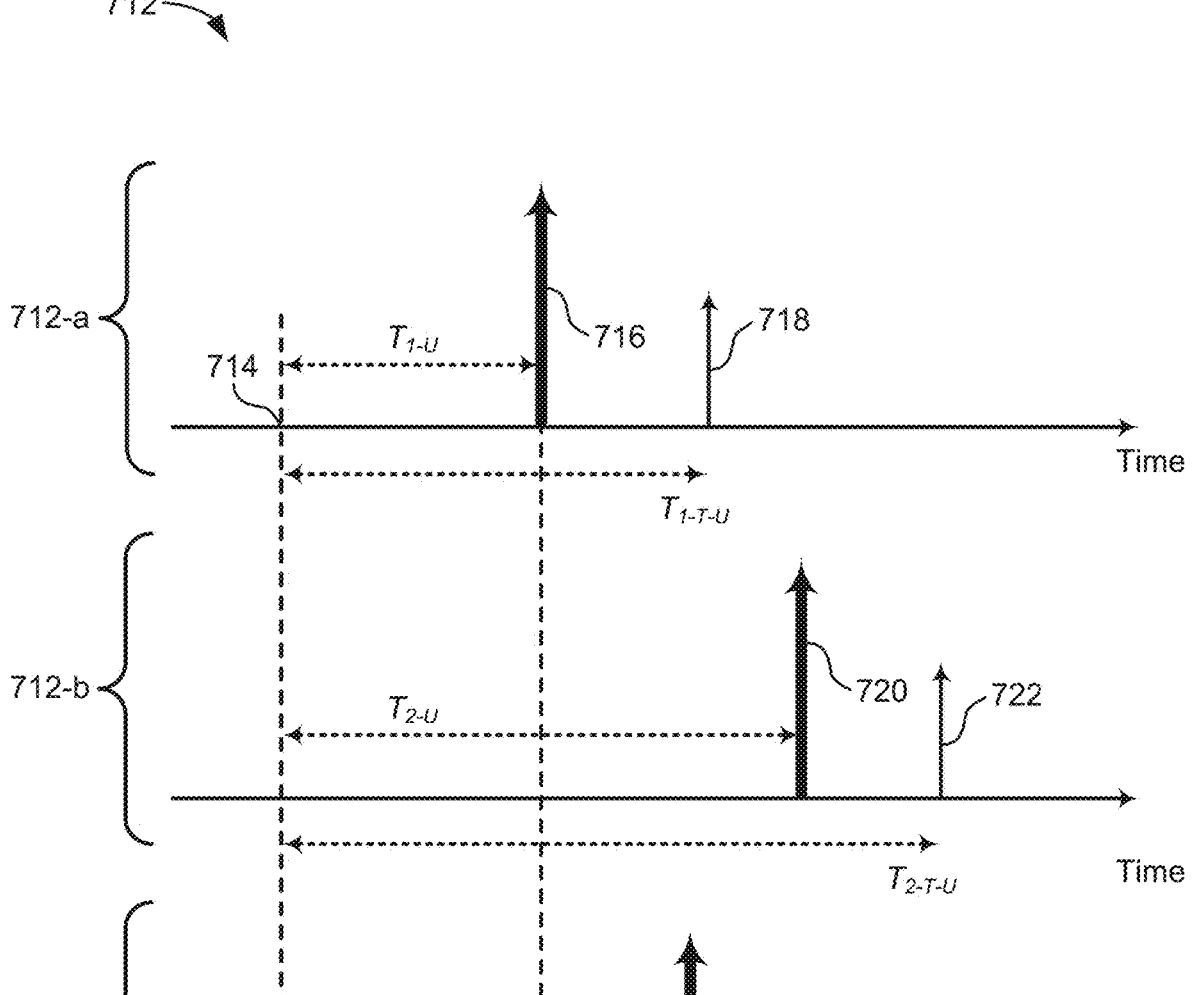
FIG. 7B illustrates an example of a time-domain plot of reference signal sensing, according to aspects of the disclosure.

FIG. 7B illustrates examples of time domain plots 712 including time-domain plot 712-a, time-domain plot 712-b, and time-domain plot 712-c, according to aspects of the disclosure. These time domain plots 712 illustrate examples of multi-TRP cooperative sensing, according to aspects of the disclosure. These time domain plots 712 each have a corresponding reference time 714 by which the measurements from one TRP can be synchronized with other measurements from other TRPs. In certain aspects, time domain plots 712 may correspond to, or includes aspects of, the corresponding element described with reference to FIGS. 1-7A, and 8-11.

As illustrated in the example of FIG. 7B, the time-domain plots 712 illustrate the relationships between the LOS and NLOS or reflected path delays for multiple TRPs. That is, for example, $T_{1-U}$, $T_{2-U}$, and $T_{3-U}$ correspond to the TOAs of reference signals on LOS paths, and $T_{1-T-U}$, $T_{2-T-U}$, and $T_{3-T-U}$ correspond to TOAs of reference signals on NLOS paths (e.g., paths reflected from a target). Multiple TRPs may transmit reference signals to a UE based on a common time reference point corresponding to a reference time 714. The reference time 714 may be the transmit time of the reference signals from the TRPs (e.g., synchronized). That is, multiple TRPs may be synchronized with each other. Each TRP may transmit a reference signal at a same time or at different times with a known offset such that reference signals from the TRPs may be synchronized when a UE is performing various measurements. The UE may perform TOA measurements based on reference signals from multiple TRPs (e.g., a first TRP, a second TRP, and a third TRP).

For example, in the first time-domain plot 712-*a*, a target may receive a sensing signal from a first TRP at a time 716, and a UE may receive the sensing signal from the first TRP via the target at a time 718. As illustrated in the second time-domain plot 712-*b*, a target may receive a sensing signal from a second TRP at a time 720, and a UE may receive the sensing signal from the second TRP via the target at a time 722. As illustrated in the third time-domain plot 712-*c*, a target may receive a sensing signal from a third TRP at a time 724, and a UE may receive the sensing signal from the third TRP via the target at a time 726. Once the UE receives the sensing signals from the TRPs, the UE may perform measurements on the sensing signals (e.g., determining the TOAs of the sensing signals). Time 716, time 712, and time 724 may be referred to as first arrival paths (FAPs) of the sensing signals from each of the corresponding TRPs. Time 718, time 722, and time 726 may be referred to additional arrival paths of the sensing signals from each of the corresponding TRPs. The UE may then report some or all of these measurements to a network, and the network may use these measurements to determine a position of the target.

Figure 8:
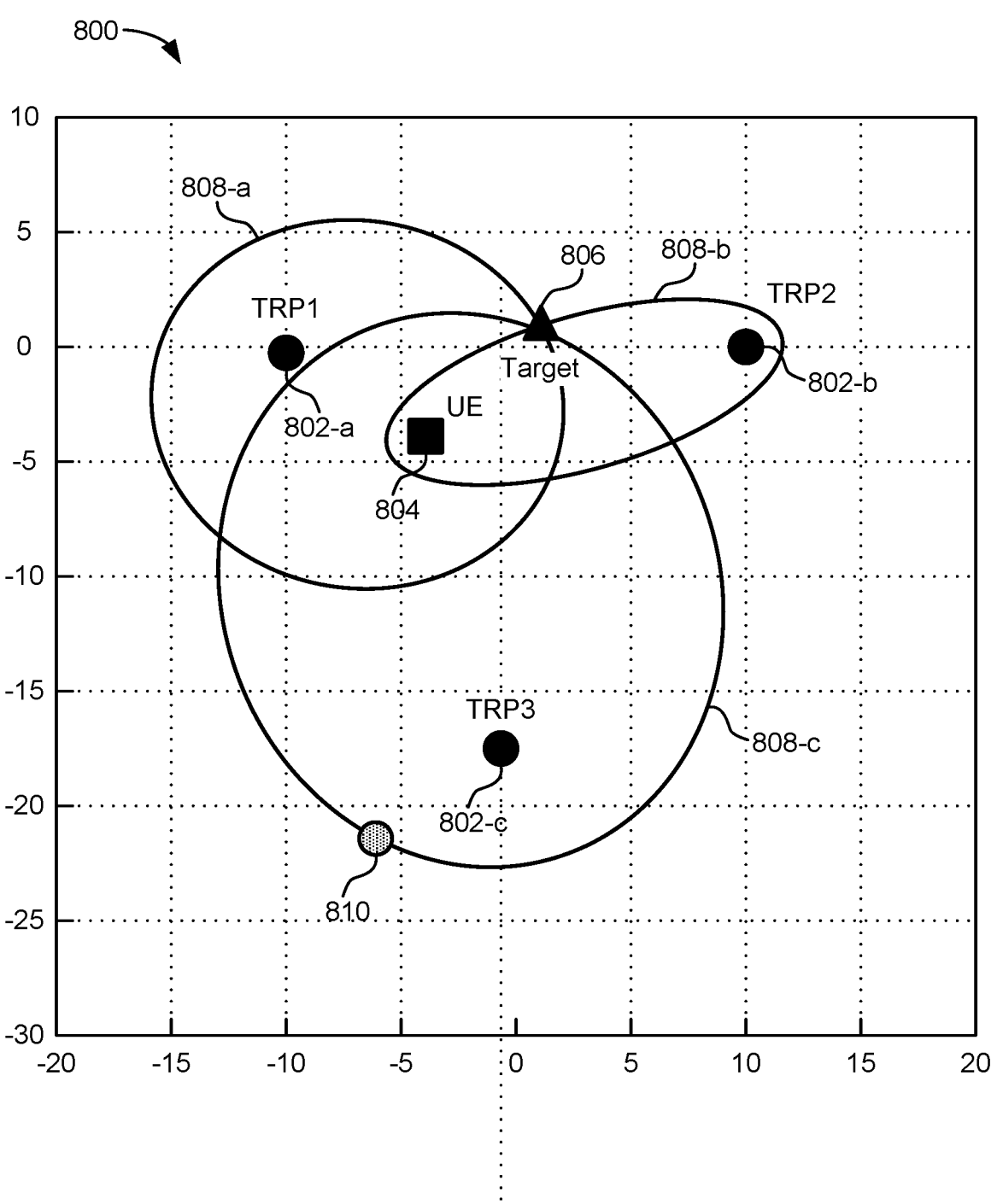
FIG. 8 illustrates an example of ellipsoid-based sensing that may be employed by a wireless communication system, according to aspects of the disclosure.

FIG. 8 illustrates an example of ellipsoid-based sensing 800 in the context of a wireless communication system, according to aspects of the disclosure. In certain aspects, wireless communication system 800 is an example of, or includes aspects of, the corresponding elements described with reference to FIGS. 1-7B and 9-11. In some examples, wireless communication system 800 includes TRP 802-*a*, TRP 802-*b*, TRP 802-*c*. UE 804, and target 806.

In some aspects, ellipsoid-based sensing 800 may use TOA measurements to determine the position of a target 806. As described with reference to FIG. 7A, for example, the network may use sensing signal measurements from a UE 804 to determine the length of a reflected path between the UE 804 and each of a first TRP 802-*a*, a second TRP 802-*b*, and a third TRP 803-*c*. The length of the reflected paths may be denoted as $R_{1-T-U}$, $R_{2-T-U}$, and $R_{3-T-U}$ for the first TRP 802-*a*, the second TRP 802-*b*, and the third TRP 802-*c*, respectively. The values for $R_{1-T-U}$, $R_{2-T-U}$, and $R_{3-T-U}$ specify ellipses 808 for the first TRP 802-*a*, the second TRP 802-*b*, and the third TRP 802-*c*, respectively. Each ellipse 808 has a focus point between the UE 804 a corresponding TRP 802.

The ellipse 808 for each TRP 802 may specify possible positions of the target 806 based on measurements of sensing signals from the respective TRP 802. That is, for example, because any point 810 (e.g., point P) on the ellipse 808-*c* for the third TRP 802-*c* may satisfy $R_{3-P}+R_{P-U}=R_{3-T-U}$, a network may determine that the target 806 is positioned on the ellipse 808-*c*. Similarly, the network may determine that the target 806 is positioned on the ellipse 808-*a* and the ellipse 808-*b*. Because the network may determine that the target 806 is positioned on each of the ellipses 808, the network may determine the position of the target 806 by locating the intersecting point of the multiple ellipses 808 using ellipsoid-based sensing 800 techniques.

Figure 9:
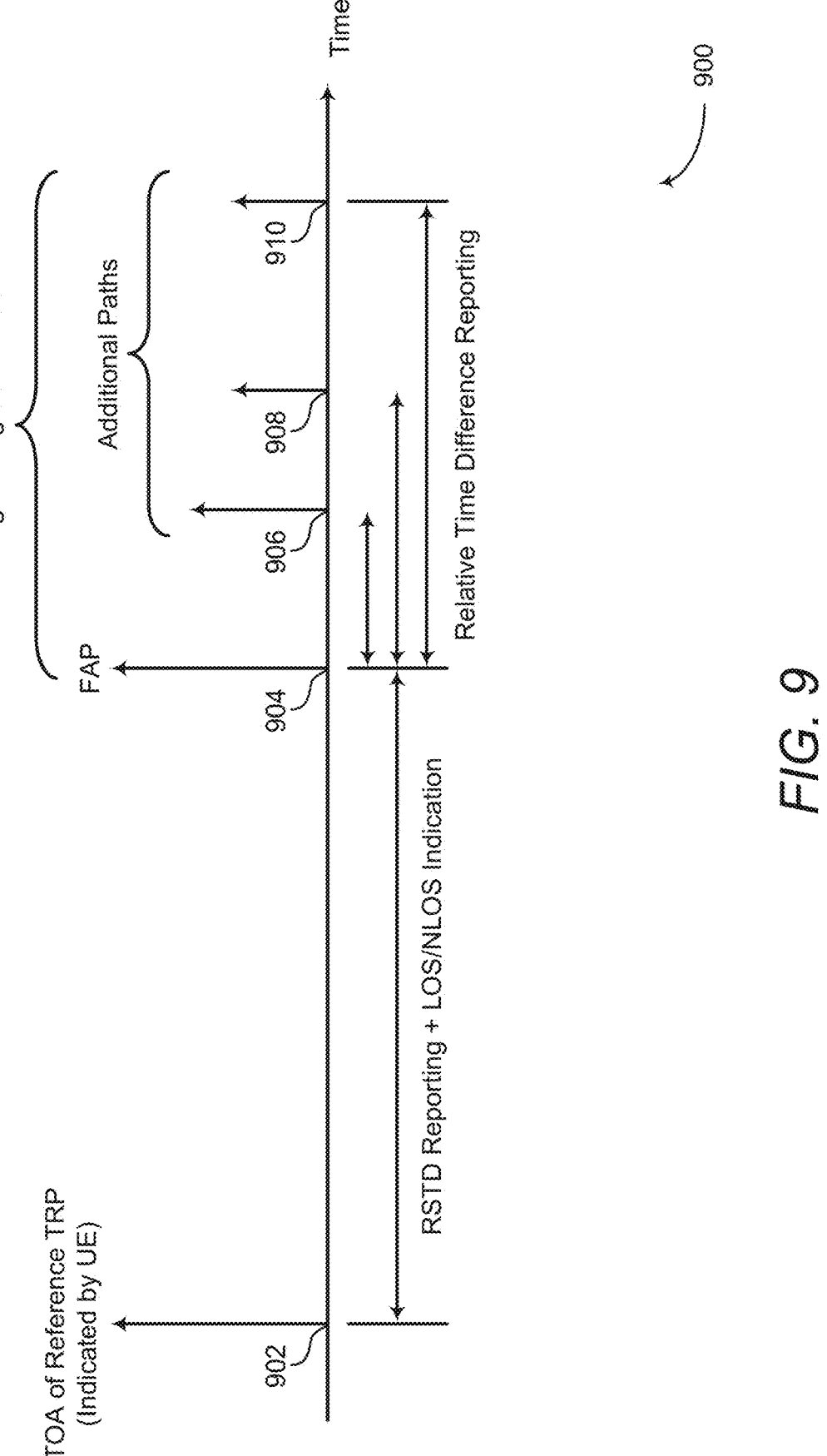
FIG. 9 illustrates an example of a time-domain plot of reference signal sensing, according to aspects of the disclosure.

FIG. 9 illustrates an example of a time-domain plot 900 of reference signal sensing, according to aspects of the disclosure. In certain aspects, the time domain plot 900 may correspond to, or includes aspects of, the corresponding element described with reference to FIGS. 1-8, 10, and 11. That is, for example, the time domain plot 900 may correspond to various sensing signals received from TRPs in a wireless communication system.

In some examples, a UE may receive reference signals from multiple TRPs, and the UE may determine the TOAs of the reference signals from each TRP. The UE may report an RSTD corresponding to the TOA of a reference signal from a TRP by indicating a difference between the TOA of the reference signal and the TOA of a previous reference signal. That is, for example, the UE may report a RSTD between a reference signal received from a reference TRP at a first time 902 and a first reference signal received from a neighbor TRP at a second time 904 (e.g., a FAP). In some examples, the UE may also report an RSTD between the second time 904 and any later time (e.g., a third time 906, a fourth time 908, or a fifth time 910) at which another reference signal is received from the neighbor TRP (e.g., on an additional arrival path, such as a reflected path from a target).

In some examples, the UE may transmit downlink time difference of arrival (TDOA) signal measurement information including the RSTDs for various reference signals received from one or more neighbor TRPs. In some examples, for each neighbor TRP and each RSTD measurement of a reference signal relative to the first time 902, the UE may report a LOS or NLOS indicator indicating whether the UE determined that the reference signal was received on a LOS path or an NLOS path.

The downlink TDOA signal measurement information transmitted by the UE may include a measurement element with the RSTD between the first time 902 and the second time 904 (e.g., an nr-RSTD specifying the relative timing difference between a neighbor TRP and a reference TRP). The signal measurement information may also include an additional path list or an extended additional path list indicating one or more additional detected path time values for a TRP or resource, relative to the first time 902 (e.g., the path timing used for determining the nr-RSTD). For example, the additional arrival path list or the extended additional arrival path list may indicate the RSTD between the second time 904 and the third time 906, the RSTD between the second time 904 and the fourth time 908, and/or the RSTD between the second time 904 and the fifth time 910.

Thus, according to some aspects, additional arrival path reporting for a neighbor TRP (e.g., per TRP) may be based on a differential delay with respect to the FAP for the neighbor TRP (e.g., the second time 904). However, in NR sensing, the additional arrival paths may be analyzed with respect to the TOA of the reference TRP (e.g., the first time 902) rather than the second time (e.g., 904). As a result, the TOA values for the additional paths (e.g., which is useful in sensing) may be derived for additional arrival paths (e.g., NLOS paths) indirectly from the RSTD of the FAP and the differential delays. In other words, the value that is used for NR sensing is the value of the TOA of the reference TRP to the FAP plus the value of the FAP to the additional path (e.g., the RSTD between the first time 902 and the second time 904 plus the RSTD between the second time 904 and the third time 906 for a first additional path).

However, in some cases, that additional computation performed by a network to determine the TOA of a reference signal on an additional path (e.g., a reflected path) for sensing may increase latency and overhead at the network, which may be detrimental to some wireless communication systems.

FIG. 10 illustrates examples of multi-UE, multi-TRP cooperative sensing that may be employed by a wireless communication system 1000, according to aspects of the disclosure. In certain aspects, wireless communication system 1000 is an example of, or includes aspects of, the corresponding elements described with reference to FIGS. 1-9 and 11. In some examples, wireless communication system 1000 includes TRPs 1002, UEs 1004, network entity 1006, sensing signals 1008, and target 1010.

In some examples, wireless communication system 1000 may support NR sensing along with NR positioning to accurately determine the geographical location or position of a target in a network. In some cases, a TRP 1002 may transmit sensing signals 1008 (e.g., reference signals) that may be reflected via a target and received by one or more UEs 1004. The UEs 1004 may perform measurements on the sensing signals and may report the measurements to the network entity 1006. The network entity 1006 may use the measurements to compute a position of the target in the network. For example, the network entity 1006 may compute the lengths of the reflected paths between multiple TRPs 1002 and a UE 1004 based on the TOAs of sensing signals transmitted by the TRPs 1002 to the UE 1004. In some cases, the network may triangulate a location or position of the target based on the lengths of the reflected paths between the TRPs 1002 and the UE 1004 in conjunction with the known locations of the TRPs 1002 and the UE 1004 (e.g., as determined using NR positioning).

In some examples, although the reference signal measurements reported for NR positioning and NR sensing may be similar, it may be challenging to use a construct established for NR positioning reporting for NR sensing (e.g., a downlink TDOA report). For example, in NR positioning, a positioning reference TRP 1002 or resource for TOA measurements may be indicated by a UE 1004, and, for NR sensing, it may be appropriate for the reference TRP 1002 to be a LOS TRP 1002. However, the UE 1004 may determine whether a TRP 1002 is a LOS or NLOS TRP 1002 based on a best estimate, and the determination may be inaccurate. That is, for example, the UE 1004 may determine that a TRP 1002 is a LOS TRP 1002, but the TRP 1002 may be a NLOS TRP 1002. The misidentification of a TRP 1002 as a LOS TRP 1002 (e.g., the selection of a NLOS TRP 1002 as a reference TRP 1002) may cause measurement errors in NR sensing operations. Further, because each UE 1004 may determine a reference TRP 1002 with which to communicate, reference TRPs for different UEs 1004 may be different when multiple UEs 1004 are participating in cooperative sensing. The selection of different reference TRPs for different UEs 1004 may also cause measurement errors in NR sensing operations (e.g., there may be no common reference time for an NLOS measurement).

It is to be appreciated however that further measurements and reporting for NR wireless sensing may be beneficial. That is, existing positioning measurements and reporting (e.g., DL-TDOA) may be reused for sensing, but these may be inaccurate and/or inefficient, in some cases. For example, additional processing at the network entity 1006 may be needed in a cooperative sensing scheme, particularly one that involves multiple TRPs 1002 and multiple UEs 1004. In some examples, network entity 1006 (e.g., a sensing server, such as an LMF or a sensing management function (SnMF)) may perform an NR positioning procedure with respect to one or more UEs 1004. That is, for example, network entity 1006 may perform an NR positioning procedure with first UE 1004-a to determine which of TRPs 1002 would be preferable for performing sensing operations with first UE 1004-a. For example, the network entity 1006 may identify which of TRPs 1002 is an LOS TRP or a NLOS TRP. In some cases, network entity 1006 may determine that first TRP 1002-a, second TRP 1002-b, and third TRP 1002-c are all LOS TRPs. Additionally, in some cases, network entity 1006 may determine that fourth TRP 1002-d may be a NLOS TRP (e.g., a direct path being blocked by target 1010) even though a received signal strength by first UE 1004-a from fourth TRP 1002-d may be greater than a received signal strength from first TRP 1002-a. In some cases, first UE 1004-a (e.g., based on its own measurements) may incorrectly determine that fourth TRP 1002-d is a LOS TRP and report such information to network entity 1006.

Additionally, in some examples, network entity 1006 may apply outlier filtering schemes to identify which TRPs 1002 are LOS TRPs or NLOS TRPs. That is, for example, network entity 1006 may perform a random sample consensus (RANSAC) algorithm to identify which TRPS 1002 are LOS TRPs or NLOS TRPs based on data from the TRPs 1002 and UEs 1004 in the wireless communication network 1000. That is, for example, the RANSAC algorithm employed by network entity 1006 utilize iterative techniques to estimate parameters (e.g., time and signal strength parameters) associated with a model from a set of measurement data from the TRPs 1002 and UEs 1004 that contains outliers. The RANSAC algorithm may determine that these outliers are to be accorded no influence on the values of parameters to be used when identifying which TRPs 1002 are LOS TRPs or NLOS TRPs.

Accordingly, in some examples, network entity 1006 may select first TRP 1002-a as the reference TRP for sensing operations for first UE 1004-a. In some examples, the network entity 1006 may select first TRP 1002-a as the reference TRP for UE 1004-a based on first TRP 1002-a having a strongest LOS path from among the other LOS TRPs, for example, second TRP 1002-b and third TRP 1002-c. In some examples, network entity 1006 may transmit an indication to first UE 1004-a that the first TRP 1002-a is the reference TRP for sensing operations for the first UE 1004-a.

Additionally, or alternatively, first TRP 1002-a as the reference TRP may be common for all or a subset of reference signals (e.g., RS-P) to be measured for sensing operations. That is, for example, reference signal resources from synchronous TRPs (e.g., second TRP 1002-b and third TRP 1002-*c*) in a multi-TRP sensing scheme may utilize that same reference signal resource assignments as the reference signal resources assigned to the first TRP 1002-*a* as the reference TRP.

Network entity 1006 may include multiple TRPs 1002 and/or multiple UEs 1004 in a cooperative sensing scheme. That is, for example, network entity 1006 may include multiple LOS and/or NLOS TRPs 1002 in wireless communication system 1000 to be synchronized with first TRP 1002-*a* as the reference TRP. Network entity 1006 may include multiple UEs 1004, for example, second UE 1004-*b* may also have the first TRP 1002-*a* as its reference TRP for sensing operations. Additionally, or alternatively, second UE 1004-*b* may have the second TRP 1002-*b* as its reference TRP for sensing operations. That is, for example, both first UE 1004-*a* and second UE 1004-*b* may be utilized in the cooperative sensing scheme to determine a location of target 1010.

In some examples, network entity 1006 may determine a timing offset for one or more of the UEs 1004 in a cooperative sensing scheme. That is, for example, based on a known position of the UE (e.g., determined from a positioning report received from the UE after an NR positioning procedure has been performed) and a known position of the selected reference TRP for sensing operations, the network entity 1006 may determine the timing offset as:

$$T_{offset} = \frac{\|x_{ref} - \hat{x}_{UE}\|}{c},$$

where c is the speed of light.

That is, the timing offset may be based on a distance that the reference TRP is from the sensing UE. This timing offset may be used to compensate for the propagation delay between the reference TRP and the sensing UE. For example, the network entity 1006 may determine a timing offset for the first UE 1004-*a* based on the selection of the first TRP 1002-*a* as the reference TRP. The network entity 1006 may then transmit the timing offset to the first UE 1004-*a* via the first TRP 1002-*a*, for example. In some cases, the first UE 1002-*a* may apply the timing offset when performing calculations on measurements performed during the cooperative sensing scheme.

Additionally, or alternatively, the network entity 1006 may determine that the first UE 1004-*a* has GNSS capability (e.g., via a capability report from the first UE 1004-*a*, responsive to a request from the network entity 1006, etc.). Accordingly, in some cases, the network entity 1006 may transmit an indication of a reference time based on a GNSS time. In this manner, the first UE 1004-*a* may use this reference time when performing calculations on measurements performed during the cooperative sensing scheme.

In some examples, one or more UEs 1004 may report measurements associated with the cooperative sensing schemes as described herein. For example, first UE 1004-*a* may receive from network entity 1006 information related to a cooperative sensing scheme. That is, the first UE 1004-*a* may receive an indication of a reference TRP and a timing parameter (e.g., a time offset or a global navigation satellite system (GNSS) time) to use in the cooperative sensing scheme. For example, first UE 1004-*a* may receive an indication that the first TRP 1002-*a* is the reference TRP. In some cases, this indication may be received via RRC signaling from the first TRP 1002-*a* or another TRP 1002 in wireless communication system 1000. In some cases, first UE 1004-*a* determines the reference time as:

$$T_{Ref} = (FAP \text{ timing of reference } TRP) - T_{offset}.$$

That is, for example, the reference time may be based at least in part on a FAP timing of reference signals from first TRP 1002-*a* as the reference TRP received by first UE 1004-*a* and the timing parameter, such as a timing offset. In some cases, the timing parameter may be transmitted by the network entity 1006 to the first UE 1004-*a*.

In some examples, first UE 1004-*a* may measure reference signals (e.g., RS-P) and calculate TOAs for the NLOS paths of first TRP 1002-*a* as the reference TRP, as well as second TRP 1002-*b*, third TRP 1002-*c*, and/or fourth TRP 1002-*d* as neighbor TRPs being part of the cooperative sensing scheme synchronized with the first TRP 1002-*a* as the reference TRP. In some cases, the UE 1004-*a* may calculate the measurement values based on these TOAs and the determined reference time.

In some cases, the first UE 1004-*a* may refrain from reporting the TOA of the FAP for the as second TRP 1002-*b*, third TRP 1002-*c*, and/or fourth TRP 1002-*d* as neighbor TRPs. That is, while the TOAs of FAPs may be useful in NR positioning, these TOAs of FAPs for the neighbor TRPs may not provide much value in NR sensing. That is, the FAP from second TRP 1002-*b* is likely to be a LOS path, rather than a reflected path from target 1010, which is of interest in NR sensing. In some cases, however, network entity 1006 may instruct the first UE 1004-*a* whether to include the TOA of a FAP for one or more TRPs 1002. For example, network entity may indicate to first UE 1004-*a* not to report TOAs of FAPs for the neighbor TRPs. It is to be understood, that this indication whether to report the TOAs of the FAPs may be included with signaling for the indication of the reference TRP and the timing offset. In some cases, however, indication whether to report the TOAs of the FAPs may be a separate indication via a signaling instance different from the first from the signaling for the indication of the reference TRP and the timing offset.

In some examples, the UE 1004-*a* may calculate a relative time difference for the TOAs of one or more additional arrival paths of the TRPs 1002 that are part of the cooperative sensing scheme.

UE 1004-*a* may then transmit the sensing measurement report that includes these TOAs to the network entity 1006. As described herein, these TOAs may be represented as a relative time difference value that is determined from the timing offset, the TOA for the FAP of the reference TRP, and the TOA of the arrival path from the second TRP. The relative time difference value may be a single value in the sensing measurement report. The sensing measurement report may include multiple relative time difference values, for example, one for each neighbor TRP 1002 that is included in the cooperative sensing scheme.

Figure 11:
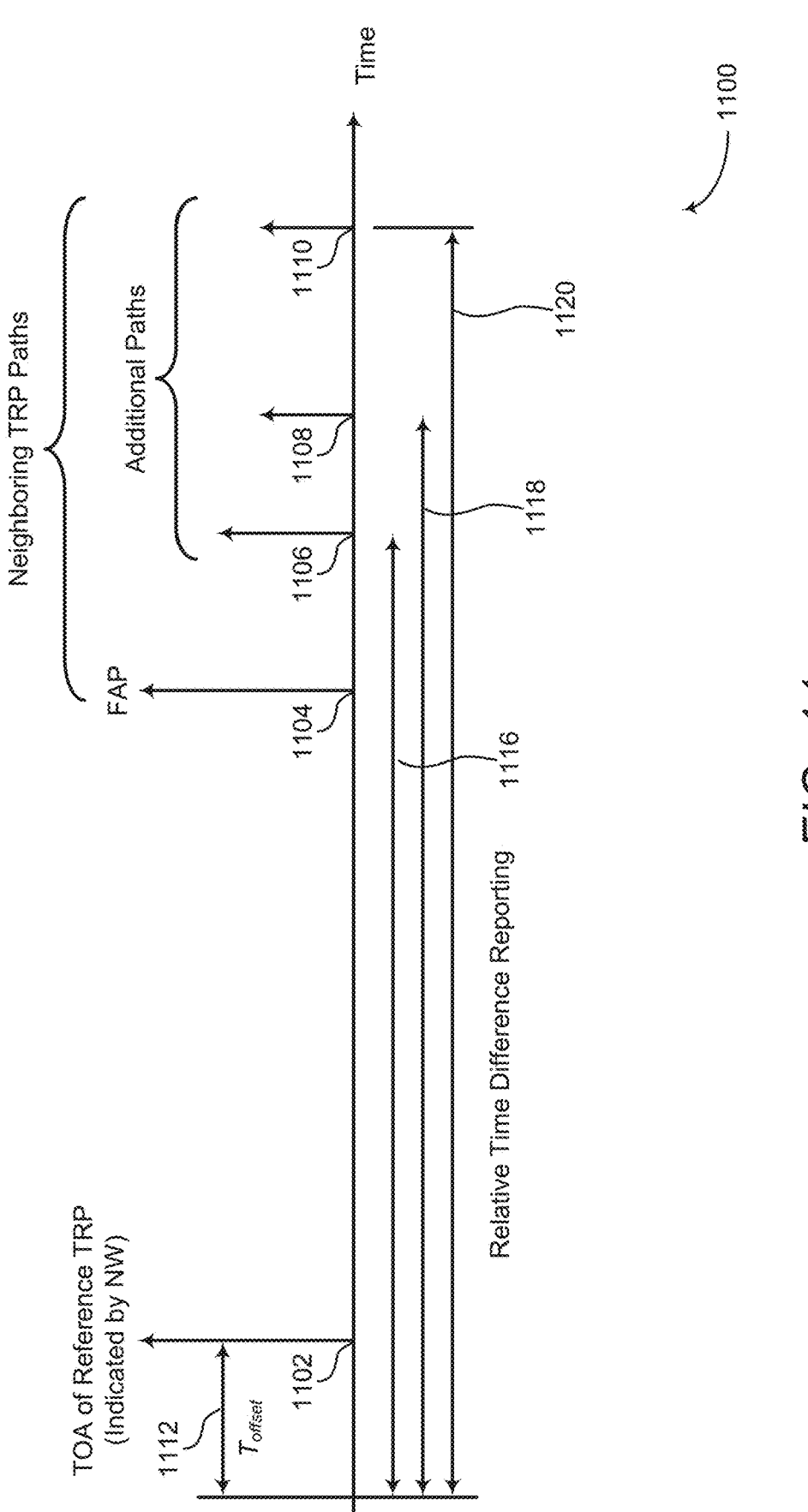
FIG. 11. illustrates an example of a time-domain plot of reference signal sensing, according to aspects of the disclosure.

FIG. 11 illustrates an example of a time-domain plot 1100 of reference signal sensing, according to aspects of the disclosure. In certain aspects, the time domain plot 1100 may correspond to, or includes aspects of, the corresponding element described with reference to FIGS. 1-10. That is, for example, the time domain plot 1100 may correspond to various sensing signals received from TRPs in a wireless communication system.

In some examples, a UE may receive reference signals from multiple TRPs, and the UE may be configured to report the TOAs of the reference signals from each TRP. In some examples, the UE may receive an indication of a reference TRP for sensing operations and a timing offset to be used. The UE may report a relative time difference reporting corresponding to NLOS paths from neighboring TRPs in a cooperative sensing scheme. That is, for example, the relative time difference reporting may include a TOA that includes the timing offset portion, an RSTD portion to a FAP of a neighboring TRP, and a relative time difference portion from the FAP of a neighboring TRP and the additional arrival paths e.g., believed by the UE to be NLOS paths from the neighboring TRP). Different reference signals may be involved in these time portions.

That is, for example, the UE may report a relative time difference value 1116 between the timing offset 1112 and a TOA of a FAP of a reference signal received from the reference TRP at a first time 1102, between the first time 1102 and a first reference signal received from a neighbor TRP at a second time 1104 (e.g., a FAP), and between the second time 1104 and a third time 1106 when the UE receives a first additional arrival path. The UE may also report a relative time difference value 1118 between the timing offset 1112 and a TOA of a FAP of a reference signal received from the reference TRP at a first time 1102, between the first time 1102 and a first reference signal received from a neighbor TRP at a second time 1104 (e.g., a FAP), and between the second time 1104 and a fourth time 1108 when the UE receives a second additional arrival path. Similarly, the UE may also report a relative time difference value 1120 between the timing offset 1112 and a TOA of a FAP of a reference signal received from the reference TRP at a first time 1102, between the first time 1102 and a first reference signal received from a neighbor TRP at a second time 1104 (e.g., a FAP), and between the second time 1104 and a fifth time 1110 when the UE receives a third additional arrival path.

That is, for example, the UE may transmit TDOA signal measurement information including the relative time difference values for various reference signals received from the one or more neighbor TRPs. In some cases, the UE may report (e.g., when instructed by a network entity) the FAP at the second time 1104 in addition to the relative time difference value(s). In some cases, the UE may report a LOS or NLOS indicator indicating whether the UE determined that the reference signal was received on a LOS path or an NLOS path.

The downlink TDOA signal measurement information transmitted by the UE may include a measurement element with the relative time difference values 1116, 1118, and/or 1120 (e.g., an nr-sensing-RSTD) specifying the relative timing difference for sensing operations that includes a designated timing offset). The signal measurement information may also include an additional path list or an extended additional path list indicating one or more additional detected path time values for a TRP or resource.

Thus, in some cases, the additional computation performed by a network to determine the TOA of a reference signal on an additional path (e.g., a reflected path) for sensing may be avoided as the value is provided by the UE in its reporting.

FIG. 12 is a flowchart of an example process 1200 associated with techniques for measurement and reporting for NR wireless sensing operations, according to aspects of the disclosure. In some implementations, one or more process blocks of FIG. 12 may be performed by a network entity (e.g., network entity 1006). In some implementations, one or more process blocks of FIG. 12 may be performed by another device or a group of devices separate from or including the network entity. Additionally, or alternatively, one or more process blocks of FIG. 12 may be performed by one or more components of network entity 306, such as processor(s) 394, memory 396, network transceiver(s) 390, and sensing component(s) 398, any or all of which may be means for performing the operations of process 1200.

As shown in FIG. 12, process 1200 may include, at block 1202, receiving a positioning report from the first UE. Means for performing the operation of block 1202 may include the processor(s), memory, or network transceiver(s) of the network entity 306 or any of the apparatuses described herein. For example, the network entity 306 may receive a positioning report from the first UE, using network transceiver(s) 390.

As further shown in FIG. 12, process 1200 may include, at block 1204, transmitting, to the first UE, an indication of a first reference TRP for sensing operations based at least on the positioning report. Means for performing the operation of block 1204 may include the processor(s), memory, or network transceiver(s) of the network entity 306 or any of the apparatuses described herein. For example, the network entity 306 may transmit, to the first UE, an indication of a first reference TRP for sensing operations based at least on the positioning report, using network transceiver(s) 390.

Process 1200 may include additional implementations, such as any single implementation or any combination of implementations described below and/or in connection with one or more other processes described elsewhere herein.

In some aspects, process 1200 includes determining one or more LOS TRPs and one or more NLOS TRPs based at least on the positioning report, and selecting the first reference TRP from the one or more LOS TRPs.

In some aspects, process 1200 includes applying a filtering scheme to determine the one or more LOS TRPs and the one or more NLOS TRPs.

In some aspects, process 1200 includes determining the one or more LOS TRPs based at least in part on a strength of a LOS path from each LOS TRP of the one or more LOS TRPs to the first UE.

In some aspects, selecting the first reference TRP from the one or more LOS TRPs comprises selecting the first reference TRP based at least in part on a number of UEs in a set of UEs including the first UE that have a LOS path with the first reference TRP.

In some aspects, process 1200 includes the first reference TRP has a first LOS path, and a second TRP of the one or more LOS TRPs has a second LOS path that is stronger than the first LOS path.

In some aspects, process 1200 includes determining a set of delay measurements, the set of delay measurements comprising a delay measurement from each LOS TRP of the one or more LOS TRPs to each UE of a plurality of UEs including the first UE, and selecting the first reference TRP from the one or more LOS TRPs based at least in part on the set of delay measurements.

In some aspects, process 1200 includes selecting a second LOS TRP to be in a first subset of the one or more LOS TRPs and the one or more NLOS TRPs with the first reference TRP based at least in part on the set of delay measurements, and transmitting an indication to the first UE that first reference signals corresponding to the first reference TRP are common with second reference signals corresponding to the second LOS TRP.

In some aspects, the first subset including the first reference TRP comprises a cooperative sensing scheme.

In some aspects, process 1200 includes transmitting an indication of a first timing offset to the first UE, and wherein the first timing offset corresponds to a time delay associated with signal transmission from the first reference TRP, and the first timing offset is determined based at least in part on the positioning report.

In some aspects, process 1200 includes transmitting an indication of a first timing reference to the first UE, and wherein the first timing reference corresponds to a GNSS associated with signal transmission from the first reference TRP.

In some aspects, process 1200 includes determining a second reference TRP for sensing operations based at least on a cooperative sensing scheme for a plurality of UEs including the first UE and a second UE, and transmitting, to the second UE, an indication of the second reference TRP for sensing operations.

In some aspects, the first reference TRP and the second reference TRP correspond to a same target object in the cooperative sensing scheme.

As will be appreciated, a technical advantage of the process 1200 may include ensuring a more effective reference TRP is used for measurement and reporting of a target object for NR sensing operations. Additionally, or alternatively, the same reference signals may be used and/or the same configurations and protocols may be used for both NR positioning and sensing techniques, thereby making use of at least some existing framework known to the UE. Additionally, or alternatively, rather than using the UE's best estimate of a LOS TRP, which may be inaccurate, the network entity may make the LOS/NLOS decision for the UE based on various positioning information in the wireless communication system. Additionally, or alternatively, rather than allowing each UE to determine its reference TRP for sensing, a coordinated sensing scheme can align multiple UEs that are positioned effectively with a single reference TRP so that each UE has a common reference time for the sensing operations.

Although FIG. 12 shows example blocks of process 1200, in some implementations, process 1200 may include additional blocks, fewer blocks, different blocks, or differently arranged blocks than those depicted in FIG. 12. Additionally, or alternatively, two or more of the blocks of process 1200 may be performed in parallel.

FIG. 13 is a flowchart of an example process 1300 associated with techniques for measurement and reporting for NR wireless sensing operations, according to aspects of the disclosure. In some implementations, one or more process blocks of FIG. 13 may be performed by a UE (e.g., UE 1004). In some implementations, one or more process blocks of FIG. 13 may be performed by another device or a group of devices separate from or including the UE. Additionally, or alternatively, one or more process blocks of FIG. 13 may be performed by one or more components of a UE 302, such as a processor(s) 332, memory 340, or transceiver(s) 310, any or all of which may be means for performing the operations of process 1300.

As shown in FIG. 13, process 1300 may include, at block 1302, receiving, from a network entity, an indication of a first reference TRP to use in a cooperative sensing scheme. Means for performing the operation of block 1302 may include the processor(s), memory, or transceiver(s) of UE 302 or any of the apparatuses described herein. For example, the UE may receive, from a network entity, an indication of a first reference TRP to use in a cooperative sensing scheme, using transceiver(s) 310.

As further shown in FIG. 13, process 1300 may include, at block 1304, transmitting a sensing measurement report including one or more measurements associated with TOAs of arrival paths of the first reference TRP and one or more neighboring TRPs with respect to a reference time. Means for performing the operation of block 1304 may include the processor(s), memory, or transceiver(s) of UE 302 or any of the apparatuses described herein. For example, the UE may transmit a sensing measurement report including one or more measurements associated with TOAs of arrival paths of the first reference TRP and one or more neighboring TRPs with respect to a reference time, using transceiver(s) 310.

Process 1300 may include additional implementations, such as any single implementation or any combination of implementations described below and/or in connection with one or more other processes described elsewhere herein.

In some aspects, the reference time is determined based at least in part on a transmission time associated with the first reference TRP.

In some aspects, process 1300 includes receiving, from the network entity, an indication of a timing offset to use in the cooperative sensing scheme.

In some aspects, the reference time is determined based at least in part on the timing offset.

In some aspects, process 1300 includes determining a relative time difference value associated with a TOA of an arrival path from a second TRP of the one or more neighboring TRPs from the timing offset, a TOA for a FAP of the first reference TRP, and the TOA of the arrival path from the second TRP, and including the relative time difference value in the sensing measurement report.

In some aspects, at least one arrival path of the arrival paths of the first reference TRP and the one or more neighboring TRPs is estimated to be a NLOS path.

In some aspects, process 1300 includes receiving an indication that the UE is to refrain from including a TOA associated with a FAP of a second TRP of the one or more neighboring TRPs in the sensing measurement report and to include a TOA associated with a FAP of a third TRP of the one or more neighboring TRPs in the sensing measurement report.

As will be appreciated, a technical advantage of the process 1300 may include reducing the latency and overhead at a network entity by reducing the computation steps and time needed by the network entity to determine a position of a target object being sensed by the UE reporting an RSTD value of a NLOS path, which is of interest for sensing computations. That is, for example, the network entity may avoid deriving the NLOS path indirectly from an RSTD of the FAP and differential delays.

Although FIG. 13 shows example blocks of process 1300, in some implementations, process 1300 may include additional blocks, fewer blocks, different blocks, or differently arranged blocks than those depicted in FIG. 13. Additionally, or alternatively, two or more of the blocks of process 1300 may be performed in parallel.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a network entity, comprising: receiving a positioning report from a first user equipment (UE); and transmitting, to the first UE, an indication of a first reference transmission-reception point (TRP) for sensing operations based at least on the positioning report.

Clause 2. The method of clause 1, further comprising: determining one or more line of sight (LOS) transmission-reception points (TRPs) and one or more non-line of sight (NLOS) TRPs based at least on the positioning report; and selecting the first reference TRP from the one or more LOS TRPs.

Clause 3. The method of clause 2, further comprising: applying a filtering scheme to determine the one or more LOS TRPs and the one or more NLOS TRPs.

Clause 4. The method of any of clauses 2 to 3, further comprising: determining the one or more LOS TRPs based at least in part on a strength of a LOS path from each LOS TRP of the one or more LOS TRPs to the first UE.

Clause 5. The method of any of clauses 2 to 4, wherein selecting the first reference TRP from the one or more LOS TRPs comprises: selecting the first reference TRP based at least in part on a number of user equipments (UEs) in a set of UEs including the first UE that have a LOS path with the first reference TRP.

Clause 6. The method of clause 5, wherein: the first reference TRP has a first LOS path; and a second TRP of the one or more LOS TRPs has a second LOS path that is stronger than the first LOS path.

Clause 7. The method of any of clauses 2 to 6, further comprising: determining a set of delay measurements, the set of delay measurements comprising a delay measurement from each LOS TRP of the one or more LOS TRPs to each UE of a plurality of user equipments (UEs) including the first UE; and selecting the first reference TRP from the one or more LOS TRPs based at least in part on the set of delay measurements.

Clause 8. The method of clause 7, further comprising: selecting a second LOS TRP to be in a first subset of the one or more LOS TRPs and the one or more NLOS TRPs with the first reference TRP based at least in part on the set of delay measurements; and transmitting an indication to the first UE that first reference signals corresponding to the first reference TRP are common with second reference signals corresponding to the second LOS TRP.

Clause 9. The method of clause 8, wherein the first subset including the first reference TRP comprises a cooperative sensing scheme.

Clause 10. The method of any of clauses 1 to 9, further comprising: transmitting an indication of a first timing offset to the first UE, and wherein: the first timing offset corresponds to a time delay associated with signal transmission from the first reference TRP; and the first timing offset is determined based at least in part on the positioning report.

Clause 11. The method of any of clauses 1 to 10, further comprising: transmitting an indication of a first timing reference to the first UE, and wherein the first timing reference corresponds to a global navigation satellite system (GNSS) associated with signal transmission from the first reference TRP.

Clause 12. The method of any of clauses 1 to 11, further comprising: determining a second reference TRP for sensing operations based at least on a cooperative sensing scheme for a plurality of user equipments (UEs) including the first UE and a second UE; and transmitting, to the second UE, an indication of the second reference TRP for sensing operations.

Clause 13. The method of clause 12, wherein the first reference TRP and the second reference TRP correspond to a same target object in the cooperative sensing scheme.

Clause 14. A method of wireless communication performed by a user equipment (UE), comprising: receiving, from a network entity, an indication of a first reference transmission-reception point (TRP) to use in a cooperative sensing scheme; and transmitting a sensing measurement report including one or more measurements associated with time of arrivals (TOAs) of arrival paths of the first reference TRP and one or more neighboring transmission-reception points (TRPs) with respect to a reference time.

Clause 15. The method of clause 14, wherein the reference time is determined based at least in part on a transmission time associated with the first reference TRP.

Clause 16. The method of any of clauses 14 to 15, further comprising: receiving, from the network entity, an indication of a timing offset to use in the cooperative sensing scheme.

Clause 17. The method of clause 16, wherein the reference time is determined based at least in part on the timing offset.

Clause 18. The method of clause 17, further comprising: determining a relative time difference value associated with a time of arrival (TOA) of an arrival path from a second TRP of the one or more neighboring TRPs from the timing offset, a TOA for a first arrival path (FAP) of the first reference TRP, and the TOA of the arrival path from the second TRP; and including the relative time difference value in the sensing measurement report.

Clause 19. The method of any of clauses 14 to 18, wherein at least one arrival path of the arrival paths of the first reference TRP and the one or more neighboring TRPs is estimated to be a non-line of sight (NLOS) path.

Clause 20. The method of any of clauses 14 to 19, further comprising: receiving an indication that the UE is to refrain from including a time of arrival (TOA) associated with a first arrival path (FAP) of a second TRP of the one or more neighboring TRPs in the sensing measurement report and to include a TOA associated with a FAP of a third TRP of the one or more neighboring TRPs in the sensing measurement report.

Clause 21. A network entity, comprising: one or more memories; one or more transceivers; and one or more processors communicatively coupled to the one or more memories and the one or more transceivers, the one or more processors, either alone or in combination, configured to: receive, via the one or more transceivers, a positioning report from a first user equipment (UE); and transmit, via the one or more transceivers and to the first UE, an indication of a first reference transmission-reception point (TRP) for sensing operations based at least on the positioning report.

Clause 22. The network entity of clause 21, wherein the one or more processors, either alone or in combination, are further configured to: determine one or more line of sight (LOS) transmission-reception points (TRPs) and one or more non-line of sight (NLOS) TRPs based at least on the positioning report; and select the first reference TRP from the one or more LOS TRPs.

Clause 23. The network entity of clause 22, wherein the one or more processors, either alone or in combination, are further configured to: apply a filtering scheme to determine the one or more LOS TRPs and the one or more NLOS TRPs.

Clause 24. The network entity of any of clauses 22 to 23, wherein the one or more processors, either alone or in combination, are further configured to: determine the one or more LOS TRPs based at least in part on a strength of a LOS path from each LOS TRP of the one or more LOS TRPs to the first UE.

Clause 25. The network entity of any of clauses 22 to 24, wherein the one or more processors configured to select the first reference TRP from the one or more LOS TRPs comprises the one or more processors, either alone or in combination, configured to: select the first reference TRP based at least in part on a number of user equipments (UEs) in a set of UEs including the first UE that have a LOS path with the first reference TRP.

Clause 26. The network entity of clause 25, wherein: the first reference TRP has a first LOS path; and a second TRP of the one or more LOS TRPs has a second LOS path that is stronger than the first LOS path.

Clause 27. The network entity of any of clauses 22 to 26, wherein the one or more processors, either alone or in combination, are further configured to: determine a set of delay measurements, the set of delay measurements comprising a delay measurement from each LOS TRP of the one or more LOS TRPs to each UE of a plurality of user equipments (UEs) including the first UE; and select the first reference TRP from the one or more LOS TRPs based at least in part on the set of delay measurements.

Clause 28. The network entity of clause 27, wherein the one or more processors, either alone or in combination, are further configured to: select a second LOS TRP to be in a first subset of the one or more LOS TRPs and the one or more NLOS TRPs with the first reference TRP based at least in part on the set of delay measurements; and transmit, via the one or more transceivers, an indication to the first UE that first reference signals corresponding to the first reference TRP are common with second reference signals corresponding to the second LOS TRP.

Clause 29. The network entity of clause 28, wherein the first subset including the first reference TRP comprises a cooperative sensing scheme.

Clause 30. The network entity of any of clauses 21 to 29, wherein the one or more processors, either alone or in combination, are further configured to: transmit an indication of a first timing offset to the first UE, and wherein: the first timing offset corresponds to a time delay associated with signal transmission from the first reference TRP; and the first timing offset is determined based at least in part on the positioning report.

Clause 31. The network entity of any of clauses 21 to 30, wherein the one or more processors, either alone or in combination, are further configured to: transmit, via the one or more transceivers, an indication of a first timing reference to the first UE, and wherein the first timing reference corresponds to a global navigation satellite system (GNSS) associated with signal transmission from the first reference TRP.

Clause 32. The network entity of any of clauses 21 to 31, wherein the one or more processors, either alone or in combination, are further configured to: determine a second reference TRP for sensing operations based at least on a cooperative sensing scheme for a plurality of user equipments (UEs) including the first UE and a second UE; and transmit, via the one or more transceivers and to the second UE, an indication of the second reference TRP for sensing operations.

Clause 33. The network entity of clause 32, wherein the first reference TRP and the second reference TRP correspond to a same target object in the cooperative sensing scheme.

Clause 34. A user equipment (UE), comprising: one or more memories; one or more transceivers; and one or more processors communicatively coupled to the one or more memories and the one or more transceivers, the one or more processors, either alone or in combination, configured to: receive, via the one or more transceivers and from a network entity, an indication of a first reference transmission-reception point (TRP) to use in a cooperative sensing scheme; and transmit, via the one or more transceivers, a sensing measurement report including one or more measurements associated with time of arrivals (TOAs) of arrival paths of the first reference TRP and one or more neighboring transmission-reception points (TRPs) with respect to a reference time.

Clause 35. The UE of clause 34, wherein the reference time is determined based at least in part on a transmission time associated with the first reference TRP.

Clause 36. The UE of any of clauses 34 to 35, wherein the one or more processors, either alone or in combination, are further configured to: receive, via the one or more transceivers and from the network entity, an indication of a timing offset to use in the cooperative sensing scheme.

Clause 37. The UE of clause 36, wherein the reference time is determined based at least in part on the timing offset.

Clause 38. The UE of clause 37, wherein the one or more processors, either alone or in combination, are further configured to: determine a relative time difference value associated with a time of arrival (TOA) of an arrival path from a second TRP of the one or more neighboring TRPs from the timing offset, a TOA for a first arrival path (FAP) of the first reference TRP, and the TOA of the arrival path from the second TRP; and include the relative time difference value in the sensing measurement report.

Clause 39. The UE of any of clauses 34 to 38, wherein at least one arrival path of the arrival paths of the first reference TRP and the one or more neighboring TRPs is estimated to be a non-line of sight (NLOS) path.

Clause 40. The UE of any of clauses 34 to 39, wherein the one or more processors, either alone or in combination, are further configured to: receive, via the one or more transceivers, an indication that the UE is to refrain from including a time of arrival (TOA) associated with a first arrival path (FAP) of a second TRP of the one or more neighboring TRPs in the sensing measurement report and to include a TOA associated with a FAP of a third TRP of the one or more neighboring TRPs in the sensing measurement report.

Clause 41. A network entity, comprising: means for receiving a positioning report from a first user equipment (UE); and means for transmitting, to the first UE, an indication of a first reference transmission-reception point (TRP) for sensing operations based at least on the positioning report.

Clause 42. The network entity of clause 41, further comprising: means for determining one or more line of sight (LOS) transmission-reception points (TRPs) and one or more non-line of sight (NLOS) TRPs based at least on the positioning report; and means for selecting the first reference TRP from the one or more LOS TRPs.

Clause 43. The network entity of clause 42, further comprising: means for applying a filtering scheme to determine the one or more LOS TRPs and the one or more NLOS TRPs.

Clause 44. The network entity of any of clauses 42 to 43, further comprising: means for determining the one or more LOS TRPs based at least in part on a strength of a LOS path from each LOS TRP of the one or more LOS TRPs to the first UE.

Clause 45. The network entity of any of clauses 42 to 44, wherein the means for selecting the first reference TRP from the one or more LOS TRPs comprises: means for selecting the first reference TRP based at least in part on a number of user equipments (UEs) in a set of UEs including the first UE that have a LOS path with the first reference TRP.

Clause 46. The network entity of clause 45, wherein: the first reference TRP has a first LOS path; and a second TRP of the one or more LOS TRPs has a second LOS path that is stronger than the first LOS path.

Clause 47. The network entity of any of clauses 42 to 46, further comprising: means for determining a set of delay measurements, the set of delay measurements comprising a delay measurement from each LOS TRP of the one or more LOS TRPs to each UE of a plurality of user equipments (UEs) including the first UE; and means for selecting the first reference TRP from the one or more LOS TRPs based at least in part on the set of delay measurements.

Clause 48. The network entity of clause 47, further comprising: means for selecting a second LOS TRP to be in a first subset of the one or more LOS TRPs and the one or more NLOS TRPs with the first reference TRP based at least in part on the set of delay measurements; and means for transmitting an indication to the first UE that first reference signals corresponding to the first reference TRP are common with second reference signals corresponding to the second LOS TRP.

Clause 49. The network entity of clause 48, wherein the first subset including the first reference TRP comprises a cooperative sensing scheme.

Clause 50. The network entity of any of clauses 41 to 49, further comprising: means for transmitting an indication of a first timing offset to the first UE, and wherein: the first timing offset corresponds to a time delay associated with signal transmission from the first reference TRP; and the first timing offset is determined based at least in part on the positioning report.

Clause 51. The network entity of any of clauses 41 to 50, further comprising: means for transmitting an indication of a first timing reference to the first UE, and wherein the first timing reference corresponds to a global navigation satellite system (GNSS) associated with signal transmission from the first reference TRP.

Clause 52. The network entity of any of clauses 41 to 51, further comprising: means for determining a second reference TRP for sensing operations based at least on a cooperative sensing scheme for a plurality of user equipments (UEs) including the first UE and a second UE; and means for transmitting, to the second UE, an indication of the second reference TRP for sensing operations.

Clause 53. The network entity of clause 52, wherein the first reference TRP and the second reference TRP correspond to a same target object in the cooperative sensing scheme.

Clause 54. A user equipment (UE), comprising: means for receiving, from a network entity, an indication of a first reference transmission-reception point (TRP) to use in a cooperative sensing scheme; and means for transmitting a sensing measurement report including one or more measurements associated with time of arrivals (TOAs) of arrival paths of the first reference TRP and one or more neighboring transmission-reception points (TRPs) with respect to a reference time.

Clause 55. The UE of clause 54, wherein the reference time is determined based at least in part on a transmission time associated with the first reference TRP.

Clause 56. The UE of any of clauses 54 to 55, further comprising: means for receiving, from the network entity, an indication of a timing offset to use in the cooperative sensing scheme.

Clause 57. The UE of clause 56, wherein the reference time is determined based at least in part on the timing offset.

Clause 58. The UE of clause 57, further comprising: means for determining a relative time difference value associated with a time of arrival (TOA) of an arrival path from a second TRP of the one or more neighboring TRPs from the timing offset, a TOA for a first arrival path (FAP) of the first reference TRP, and the TOA of the arrival path from the second TRP; and means for including the relative time difference value in the sensing measurement report.

Clause 59. The UE of any of clauses 54 to 58, wherein at least one arrival path of the arrival paths of the first reference TRP and the one or more neighboring TRPs is estimated to be a non-line of sight (NLOS) path.

Clause 60. The UE of any of clauses 54 to 59, further comprising: means for receiving an indication that the UE is to refrain from including a time of arrival (TOA) associated with a first arrival path (FAP) of a second TRP of the one or more neighboring TRPs in the sensing measurement report and to include a TOA associated with a FAP of a third TRP of the one or more neighboring TRPs in the sensing measurement report.

Clause 61. A non-transitory computer-readable medium storing computer-executable instructions that, when executed by a network entity, cause the network entity to: receive a positioning report from a first user equipment (UE); and transmit, to the first UE, an indication of a first reference transmission-reception point (TRP) for sensing operations based at least on the positioning report.

Clause 62. The non-transitory computer-readable medium of clause 61, further comprising computer-executable instructions that, when executed by the network entity, cause the network entity to: determine one or more line of sight (LOS) transmission-reception points (TRPs) and one or more non-line of sight (NLOS) TRPs based at least on the positioning report; and select the first reference TRP from the one or more LOS TRPs.

Clause 63. The non-transitory computer-readable medium of clause 62, further comprising computer-executable instructions that, when executed by the network entity, cause the network entity to: apply a filtering scheme to determine the one or more LOS TRPs and the one or more NLOS TRPs.

Clause 64. The non-transitory computer-readable medium of any of clauses 62 to 63, further comprising computer-executable instructions that, when executed by the network entity, cause the network entity to: determine the one or more LOS TRPs based at least in part on a strength of a LOS path from each LOS TRP of the one or more LOS TRPs to the first UE.

Clause 65. The non-transitory computer-readable medium of any of clauses 62 to 64, wherein the computer-executable instructions that, when executed by the network entity, cause the network entity to select the first reference TRP from the one or more LOS TRPs comprise computer-executable instructions that, when executed by the network entity, cause the network entity to: select the first reference TRP based at least in part on a number of user equipments (UEs) in a set of UEs including the first UE that have a LOS path with the first reference TRP.

Clause 66. The non-transitory computer-readable medium of clause 65, wherein: the first reference TRP has a first LOS path; and a second TRP of the one or more LOS TRPs has a second LOS path that is stronger than the first LOS path.

Clause 67. The non-transitory computer-readable medium of any of clauses 62 to 66, further comprising computer-executable instructions that, when executed by the network entity, cause the network entity to: determine a set of delay measurements, the set of delay measurements comprising a delay measurement from each LOS TRP of the one or more LOS TRPs to each UE of a plurality of user equipments (UEs) including the first UE; and select the first reference TRP from the one or more LOS TRPs based at least in part on the set of delay measurements.

Clause 68. The non-transitory computer-readable medium of clause 67, further comprising computer-executable instructions that, when executed by the network entity, cause the network entity to: select a second LOS TRP to be in a first subset of the one or more LOS TRPs and the one or more NLOS TRPs with the first reference TRP based at least in part on the set of delay measurements; and transmit an indication to the first UE that first reference signals corresponding to the first reference TRP are common with second reference signals corresponding to the second LOS TRP.

Clause 69. The non-transitory computer-readable medium of clause 68, wherein the first subset including the first reference TRP comprises a cooperative sensing scheme.

Clause 70. The non-transitory computer-readable medium of any of clauses 61 to 69, further comprising computer-executable instructions that, when executed by the network entity, cause the network entity to: transmit an indication of a first timing offset to the first UE, and wherein: the first timing offset corresponds to a time delay associated with signal transmission from the first reference TRP; and the first timing offset is determined based at least in part on the positioning report.

Clause 71. The non-transitory computer-readable medium of any of clauses 61 to 70, further comprising computer-executable instructions that, when executed by the network entity, cause the network entity to: transmit an indication of a first timing reference to the first UE, and wherein the first timing reference corresponds to a global navigation satellite system (GNSS) associated with signal transmission from the first reference TRP.

Clause 72. The non-transitory computer-readable medium of any of clauses 61 to 71, further comprising computer-executable instructions that, when executed by the network entity, cause the network entity to: determine a second reference TRP for sensing operations based at least on a cooperative sensing scheme for a plurality of user equipments (UEs) including the first UE and a second UE; and transmit, to the second UE, an indication of the second reference TRP for sensing operations.

Clause 73. The non-transitory computer-readable medium of clause 72, wherein the first reference TRP and the second reference TRP correspond to a same target object in the cooperative sensing scheme.

Clause 74. A non-transitory computer-readable medium storing computer-executable instructions that, when executed by a user equipment (UE), cause the UE to: receive, from a network entity, an indication of a first reference transmission-reception point (TRP) to use in a cooperative sensing scheme; and transmit a sensing measurement report including one or more measurements associated with time of arrivals (TOAs) of arrival paths of the first reference TRP and one or more neighboring transmission-reception points (TRPs) with respect to a reference time.

Clause 75. The non-transitory computer-readable medium of clause 74, wherein the reference time is determined based at least in part on a transmission time associated with the first reference TRP.

Clause 76. The non-transitory computer-readable medium of any of clauses 74 to 75, further comprising computer-executable instructions that, when executed by the UE, cause the UE to: receive, from the network entity, an indication of a timing offset to use in the cooperative sensing scheme.

Clause 77. The non-transitory computer-readable medium of clause 76, wherein the reference time is determined based at least in part on the timing offset.

Clause 78. The non-transitory computer-readable medium of clause 77, further comprising computer-executable instructions that, when executed by the UE, cause the UE to: determine a relative time difference value associated with a time of arrival (TOA) of an arrival path from a second TRP of the one or more neighboring TRPs from the timing offset, a TOA for a first arrival path (FAP) of the first reference TRP, and the TOA of the arrival path from the second TRP; and include the relative time difference value in the sensing measurement report.

Clause 79. The non-transitory computer-readable medium of any of clauses 74 to 78, wherein at least one arrival path of the arrival paths of the first reference TRP and the one or more neighboring TRPs is estimated to be a non-line of sight (NLOS) path.

Clause 80. The non-transitory computer-readable medium of any of clauses 74 to 79, further comprising computer-executable instructions that, when executed by the UE, cause the UE to: receive an indication that the UE is to refrain from including a time of arrival (TOA) associated with a first arrival path (FAP) of a second TRP of the one or more neighboring TRPs in the sensing measurement report and to include a TOA associated with a FAP of a third TRP of the one or more neighboring TRPs in the sensing measurement report.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such. Furthermore, as used herein, the terms "set," "group," and the like are intended to include one or more of the stated elements. Also, as used herein, the terms "has," "have," "having," "comprises," "comprising," "includes," "including," and the like does not preclude the presence of one or more additional elements (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of") or the alternatives are mutually exclusive (e.g., "one or more" should not be interpreted as "one and more"). Furthermore, although components, functions, actions, and instructions may be described or claimed in the singular, the plural is contemplated unless limitation to the singular is explicitly stated. Accordingly, as used herein, the articles "a," "an," "the," and "said" are intended to include one or more of the stated elements. Additionally, as used herein, the terms "at least one" and "one or more" encompass "one" component, function, action, or instruction performing or capable of performing a described or claimed functionality and also "two or more" components, functions, actions, or instructions performing or capable of performing a described or claimed functionality in combination.

What is claimed is:

1. A method of wireless communication performed by a network entity, comprising:
   receiving a positioning report from a first user equipment (UE);
   determining one or more line of sight (LOS) transmission-reception points (TRPs) and one or more non-line of sight (NLOS) TRPs based at least on the positioning report; and
   transmitting, to the first UE, an indication of a first reference TRP for sensing operations based at least on the positioning report, wherein the first reference TRP is selected based at least in part on a number of UEs in a set of UEs including the first UE that have a LOS path with the first reference TRP.

2. The method of claim 1, further comprising:
   applying a filtering scheme to determine the one or more LOS TRPs and the one or more NLOS TRPs.

3. The method of claim 1, further comprising:
   determining the one or more LOS TRPs based at least in part on a strength of a LOS path from each LOS TRP of the one or more LOS TRPs to the first UE.

4. The method of claim 1, wherein:

the first reference TRP has a first LOS path; and a second TRP of the one or more LOS TRPs has a second LOS path that is stronger than the first LOS path.

5. The method of claim 1, further comprising:

determining a set of delay measurements, the set of delay measurements comprising a delay measurement from each LOS TRP of the one or more LOS TRPs to each UE of a plurality of user equipments (UEs) including the first UE; and selecting the first reference TRP from the one or more LOS TRPs based at least in part on the set of delay measurements.

6. The method of claim 5, further comprising:

selecting a second LOS TRP to be in a first subset of the one or more LOS TRPs and the one or more NLOS TRPs with the first reference TRP based at least in part on the set of delay measurements; and transmitting an indication to the first UE that first reference signals corresponding to the first reference TRP are common with second reference signals corresponding to the second LOS TRP.

7. The method of claim 6, wherein the first subset including the first reference TRP comprises a cooperative sensing scheme.

8. The method of claim 1, further comprising:

transmitting an indication of a first timing offset to the first UE, and wherein:

the first timing offset corresponds to a time delay associated with signal transmission from the first reference TRP; and the first timing offset is determined based at least in part on the positioning report.

9. The method of claim 1, further comprising:

transmitting an indication of a first timing reference to the first UE, and wherein the first timing reference corresponds to a global navigation satellite system (GNSS) associated with signal transmission from the first reference TRP.

10. The method of claim 1, further comprising:

determining a second reference TRP for sensing operations based at least on a cooperative sensing scheme for a plurality of user equipments (UEs) including the first UE and a second UE; and transmitting, to the second UE, an indication of the second reference TRP for sensing operations.

11. The method of claim 10, wherein the first reference TRP and the second reference TRP correspond to a same target object in the cooperative sensing scheme.

12. A method of wireless communication performed by a user equipment (UE), comprising:

receiving, from a network entity, an indication of a first reference transmission-reception point (TRP) to use in a cooperative sensing scheme, wherein the first reference TRP is selected based at least in part on a number of user equipments (UEs) in a set of UEs including the first UE that have a line of sight (LOS) path with the first reference TRP; and transmitting a sensing measurement report including one or more measurements associated with time of arrivals (TOAs) of arrival paths of the first reference TRP and one or more neighboring TRPs with respect to a reference time.

13. The method of claim 12, wherein the reference time is determined based at least in part on a transmission time associated with the first reference TRP.

14. The method of claim 12, further comprising:

receiving, from the network entity, an indication of a timing offset to use in the cooperative sensing scheme.

15. The method of claim 14, wherein the reference time is determined based at least in part on the timing offset.

16. The method of claim 14, further comprising:

determining a relative time difference value associated with a time of arrival (TOA) of an arrival path from a second TRP of the one or more neighboring TRPs from the timing offset, a TOA for a first arrival path (FAP) of the first reference TRP, and the TOA of the arrival path from the second TRP; and including the relative time difference value in the sensing measurement report.

17. The method of claim 12, wherein at least one arrival path of the arrival paths of the first reference TRP and the one or more neighboring TRPs is estimated to be a non-line of sight (NLOS) path.

18. The method of claim 12, further comprising:

receiving an indication that the UE is to refrain from including a time of arrival (TOA) associated with a first arrival path (FAP) of a second TRP of the one or more neighboring TRPs in the sensing measurement report and to include a TOA associated with a FAP of a third TRP of the one or more neighboring TRPs in the sensing measurement report.

19. A network entity, comprising:

one or more memories;

one or more transceivers; and one or more processors communicatively coupled to the one or more memories and the one or more transceivers, the one or more processors, either alone or in combination, configured to:

receive, via the one or more transceivers, a positioning report from a first user equipment (UE);

determine one or more line of sight (LOS) transmission-reception points (TRPs) and one or more non-line of sight (NLOS) TRPs based at least on the positioning report; and transmit, via the one or more transceivers and to the first UE, an indication of a first reference TRP for sensing operations based at least on the positioning report, wherein the first reference TRP is selected based at least in part on a number of UEs in a set of UEs including the first UE that have a LOS path with the first reference TRP.

20. The network entity of claim 19, wherein the one or more processors, either alone or in combination, are further configured to:

apply a filtering scheme to determine the one or more LOS TRPs and the one or more NLOS TRPs.

21. The network entity of claim 19, wherein the one or more processors, either alone or in combination, are further configured to:

determine the one or more LOS TRPs based at least in part on a strength of a LOS path from each LOS TRP of the one or more LOS TRPs to the first UE.

22. A user equipment (UE), comprising:

one or more memories;

one or more transceivers; and one or more processors communicatively coupled to the one or more memories and the one or more transceivers, the one or more processors, either alone or in combination, configured to:

receive, via the one or more transceivers and from a network entity, an indication of a first reference transmission-reception point (TRP) to use in a cooperative sensing scheme, wherein the first reference TRP is selected based at least in part on a number of user equipments (UEs) in a set of UEs including the first UE that have a line of sight (LOS) path with the first reference TRP; and transmit, via the one or more transceivers, a sensing measurement report including one or more measurements associated with time of arrivals (TOAs) of arrival paths of the first reference TRP and one or more neighboring TRPs with respect to a reference time.

23. The UE of claim 22, wherein the reference time is determined based at least in part on a transmission time associated with the first reference TRP.

24. The UE of claim 22, wherein the one or more processors, either alone or in combination, are further configured to:

receive, via the one or more transceivers and from the network entity, an indication of a timing offset to use in the cooperative sensing scheme.

25. The UE of claim 24, wherein the reference time is determined based at least in part on the timing offset.

26. The UE of claim 24, wherein the one or more processors, either alone or in combination, are further configured to:

determine a relative time difference value associated with a time of arrival (TOA) of an arrival path from a second TRP of the one or more neighboring TRPs from the timing offset, a TOA for a first arrival path (FAP) of the first reference TRP, and the TOA of the arrival path from the second TRP; and include the relative time difference value in the sensing measurement report.

* * * * *